US011858569B2

(12) United States Patent
Araki et al.

(10) Patent No.: US 11,858,569 B2
(45) Date of Patent: Jan. 2, 2024

(54) VEHICLE

(71) Applicant: AISIN CORPORATION, Kariya (JP)

(72) Inventors: Keizo Araki, Kariya (JP); Akira Mizuno, Kariya (JP); Shota Kubo, Kariya (JP)

(73) Assignee: AISIN CORPORATION, Kariya (JP)

( * ) Notice: Subject to any disclaimer, the term of this patent is extended or adjusted under 35 U.S.C. 154(b) by 2 days.

(21) Appl. No.: 17/762,934

(22) PCT Filed: Dec. 26, 2020

(86) PCT No.: PCT/JP2020/049051
§ 371 (c)(1),
(2) Date: Mar. 23, 2022

(87) PCT Pub. No.: WO2021/132706
PCT Pub. Date: Jul. 1, 2021

(65) Prior Publication Data
US 2022/0388570 A1    Dec. 8, 2022

(30) Foreign Application Priority Data
Dec. 27, 2019    (JP) .................. 2019-239941

(51) Int. Cl.
*B62D 6/00* (2006.01)
*B62D 9/02* (2006.01)
*B62D 61/08* (2006.01)

(52) U.S. Cl.
CPC ............... *B62D 6/003* (2013.01); *B62D 9/02* (2013.01); *B62D 61/08* (2013.01)

(58) Field of Classification Search
CPC .......... B62D 6/003; B62D 9/02; B62D 61/08; B62D 6/00; B60W 2300/345;
(Continued)

(56) References Cited

U.S. PATENT DOCUMENTS

| 2008/0223637 A1* | 9/2008 | Bartilson | ................. B60G 3/20 |
| | | | 180/65.265 |
| 2013/0041545 A1* | 2/2013 | Bar | ........................ B62D 6/003 |
| | | | 701/38 |

(Continued)

FOREIGN PATENT DOCUMENTS

| JP | 2016-222024 A | 12/2016 |
| JP | 2019-218007 A | 12/2019 |

OTHER PUBLICATIONS

Mar. 9, 2021 International Search Report issued in International Patent Application No. PCT/JP2020/049051.
(Continued)

*Primary Examiner* — Shardul D Patel
(74) *Attorney, Agent, or Firm* — Oliff PLC

(57) ABSTRACT

A vehicle is provided with a vehicle body, N (N is an integer equal to or larger than 2) wheels including one or more front wheels and one or more rear wheels, a force generator, and a force controller. The N wheels include one or more turn wheels turnable in the width direction of the vehicle. The force generator is configured to generate a force which changes a yaw angular acceleration. The force controller is configured to control the force generator. A gravity center of the vehicle body is located away from a rotation center of the vehicle toward front side or rear side when the vehicle turns. The force controller controls the force generator to control a roll torque in the width direction acting on the vehicle body.

7 Claims, 15 Drawing Sheets

(58) Field of Classification Search
CPC ....... B60W 2300/367; B60W 2720/18; B60W 30/04; B60W 30/045; B60W 40/112; B62J 45/4151; B62K 5/10; B62K 5/027
USPC .......................................................... 701/41
See application file for complete search history.

(56) References Cited

U.S. PATENT DOCUMENTS

| | | | |
|---|---|---|---|
| 2013/0193556 A1* | 8/2013 | Lee | H01L 28/40 |
| | | | 257/532 |
| 2018/0148118 A1* | 5/2018 | Horiguchi | B62K 5/027 |
| 2018/0281886 A1 | 10/2018 | Mizuno et al. | |
| 2018/0297636 A1* | 10/2018 | Lee | B62D 6/002 |
| 2019/0322271 A1 | 10/2019 | Ishino | |
| 2020/0108861 A1* | 4/2020 | Araki | G01P 3/44 |
| 2021/0269017 A1* | 9/2021 | Araki | B60W 30/045 |

OTHER PUBLICATIONS

May 4, 2023 Search Report issued in European Patent Application No. 20906117.

\* cited by examiner

Fig. 1
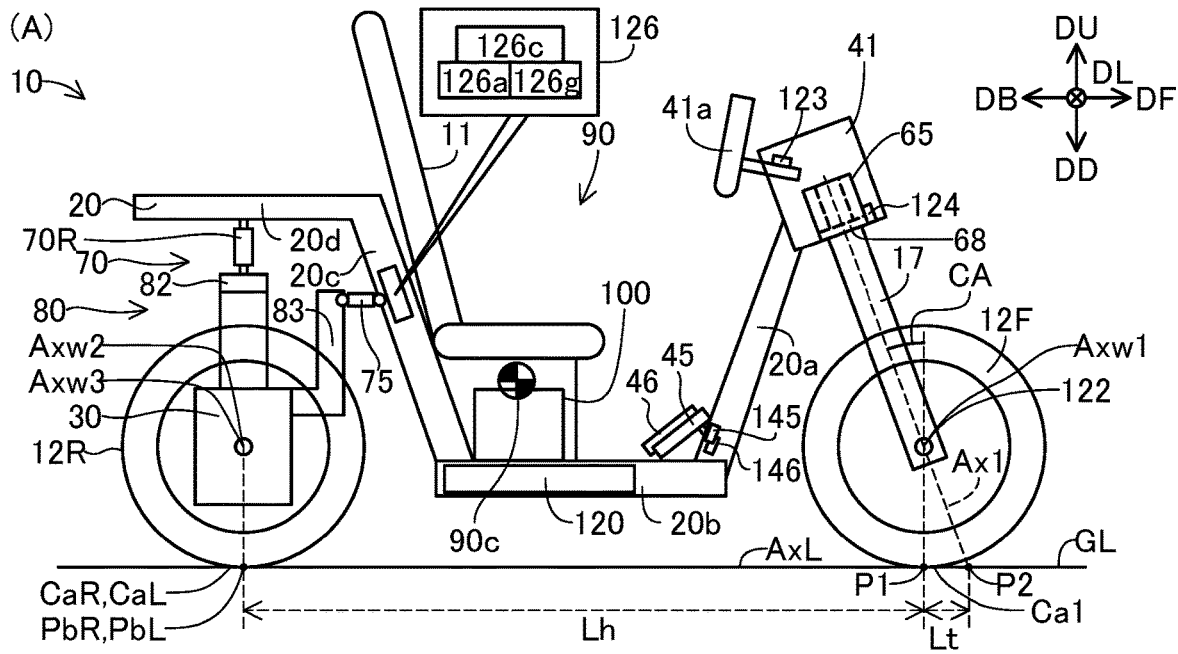
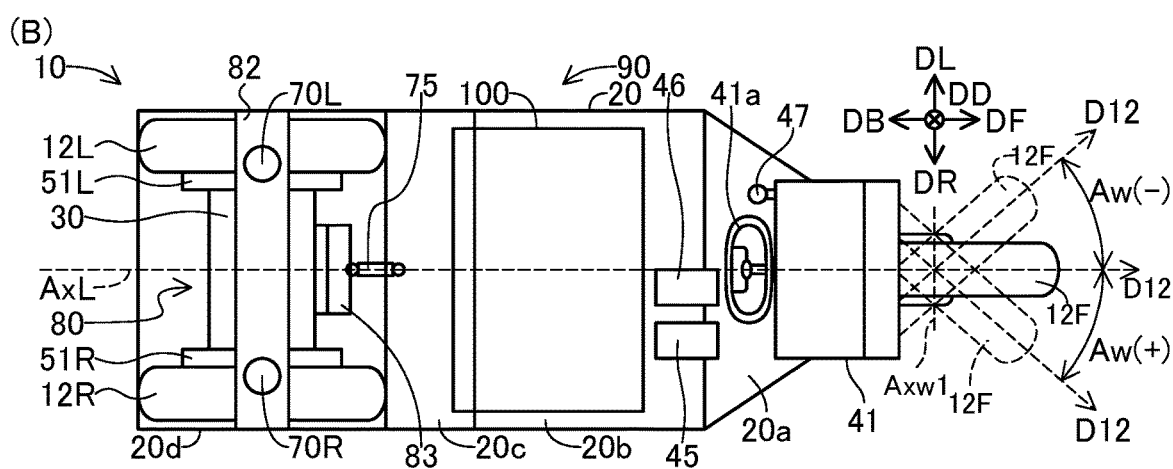
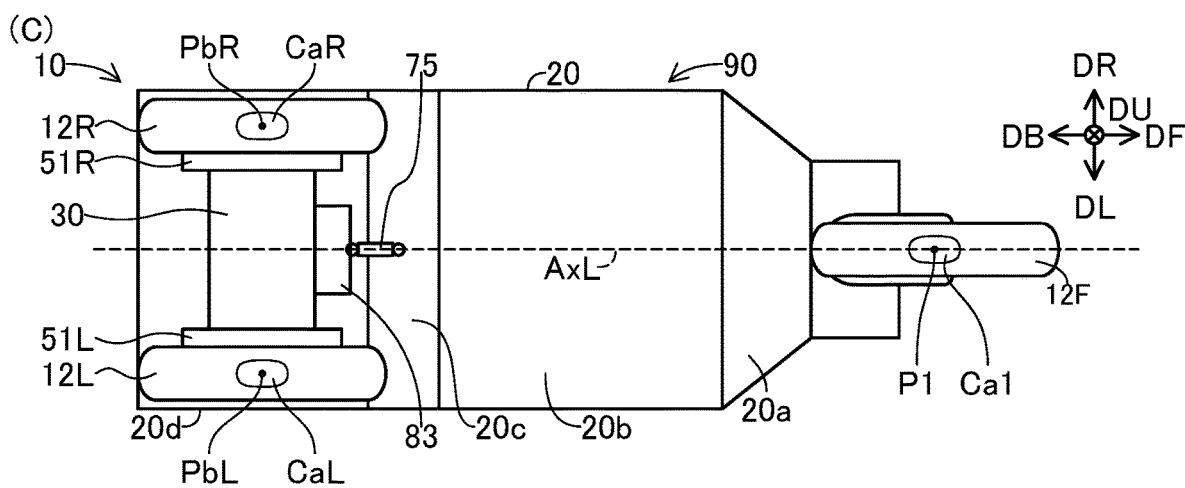

(B) $F_{12} = M*A_{90} = M*X*A_y''$ (C) $T_{q1} = Z*F_{12} = M*X*Z*A_y''$

VEHICLE

TECHNICAL FIELD

This specification relates to a vehicle.

BACKGROUND ART

A variety of vehicles have been proposed. For example, a vehicle has been proposed that includes a lean angle changing unit for changing a lean angle of a vehicle body in a vehicle width direction and a lean control unit for controlling the lean angle changing unit.

PRIOR ART DOCUMENT

Patent Document

Patent Document 1 Japanese Laid-Open Patent Publication No. 2016-222024

SUMMARY OF THE DISCLOSURE

Problems to be Solved by the Disclosure

A vehicle may include a variety of devices which generate a force. For example, the vehicle may include a front wheel as a steered wheel, and a motor which assists in steering. Such a motor changes a movement of the vehicle in a variety of ways. For example, when the motor turns the front wheel to right while the vehicle is traveling forward, the vehicle begins to turn to right, a yaw angular acceleration increases, and a yaw angular velocity increases. In general, a relationship between forces acting on the vehicle and a movement of the vehicle is complicated. Thus, there is room for innovation in terms of control of vehicle.

This specification discloses a novel technique of controlling a vehicle.

Means for Solving the Problems

The technique disclosed in this specification can be implemented as any of application examples listed below.

Application Example 1

A vehicle including:
a vehicle body;
N (N is an integer equal to or larger than 2) wheels including one or more front wheels and one or more rear wheels, the N wheels including one or more turn wheels turnable in a width direction of the vehicle;
a force generator configured to generate a force which changes a yaw angular acceleration; and
a force controller configured to control the force generator,
wherein a gravity center of the vehicle body is located away from a rotation center of the vehicle toward front side or rear side when the vehicle turns, and
the force controller controls the force generator to control a roll torque in the width direction acting on the vehicle body.

According to this configuration, the force controller uses the force which changes the yaw angular acceleration to control the roll torque acting on the vehicle.

Application Example 2

The vehicle according to Application Example 1, wherein
the force generator is configured to apply a turning torque on the one or more turn wheels, the turning torque being a torque for controlling a turn of the one or more turn wheels in the width direction,
a roll torque resulting from a component of yaw angular acceleration resulting from a turn of the one or more turn wheels and a positional difference between the gravity center and the rotation center is referred to as first type roll torque, and
the force controller:
determines reference information indicating a reference direction as a reference of direction and a reference magnitude as a reference of magnitude for the first type roll torque to act on the vehicle body; and
causes the force generator to generate the turning torque so that the direction of the first type roll torque is the same as the reference direction, and the magnitude of the first type roll torque increases with an increase in the reference magnitude.

According to this configuration, the force controller uses the reference information to control the roll torque acting on the vehicle.

Application Example 3

The vehicle according to Application Example 2, wherein
a condition that each of a vehicle velocity, the reference direction, the reference magnitude, and a yaw angular velocity of the vehicle is maintained constant is referred to as first condition, and
the force controller causes the force generator to generate a turning torque having a magnitude which decreases with an increase in a difference between an angle of turn of the one or more turn wheels and an angle of turn indicative of straight forward traveling under the first condition.

According to this configuration, the force controller can make the first type roll torque close to a roll torque having the reference direction and the reference magnitude.

Application Example 4

The vehicle according to Application Example 2 or 3, wherein
the reference information indicates a reference roll direction from a roll angle of the vehicle body to a reference roll angle, and an angle difference magnitude, the angle difference magnitude being a magnitude of difference between the roll angle of the vehicle body and the reference roll angle,
the reference roll direction indicates the reference direction, and
the angle difference magnitude indicates the reference magnitude.

According to this configuration, the force controller can use the turning torque to make an actual roll angle close to the reference roll angle.

Application Example 5

The vehicle according to Application Example 2 or 3, wherein
the reference information indicates a roll angular acceleration of the vehicle body, a magnitude of the roll angular acceleration indicates the reference magnitude, and a direction opposite to a direction of the roll angular acceleration indicates the reference direction.

According to this configuration, the force controller can use the turning torque to reduce the roll angular acceleration.

Application Example 6

The vehicle according to any one of Application Examples 2 to 5, wherein the force controller controls the force generator using the reference information, a vehicle velocity, and an angle of turn of the one or more turn wheels, and a magnitude of the turning torque increases with an increase in the reference magnitude, decreases with an increase in the vehicle velocity, and decreases with an increase in a difference between the angle of the turn of the one or more turn wheels and an angle of turn indicative of straight forward traveling.

According to this configuration, the force controller can make the magnitude of the first type roll torque close to the reference magnitude.

Application Example 7

The vehicle according to any one of Application Examples 2 to 6, wherein the one or more front wheels include the one or more turn wheels, the gravity center of the vehicle body is located away from and on front side of the rotation center, and the direction of the turning torque is opposite to the reference direction.

According to this configuration, if the one or more front wheels include the one or more turn wheels, the force generator can be controlled properly.

It should be noted that the techniques disclosed in this specification can be realized in a variety of aspects, for example, a vehicle, a vehicle controller, a vehicle control method, etc.

BRIEF DESCRIPTION OF THE DRAWINGS

FIGS. 1(A)-(C) show explanatory diagrams illustrating a vehicle 10 as one embodiment;

FIG. 13 is a flowchart showing an example control process of a steering motor 65a;

DETAILED DESCRIPTION OF THE DISCLOSURE

A. First Embodiment

Figure 2:
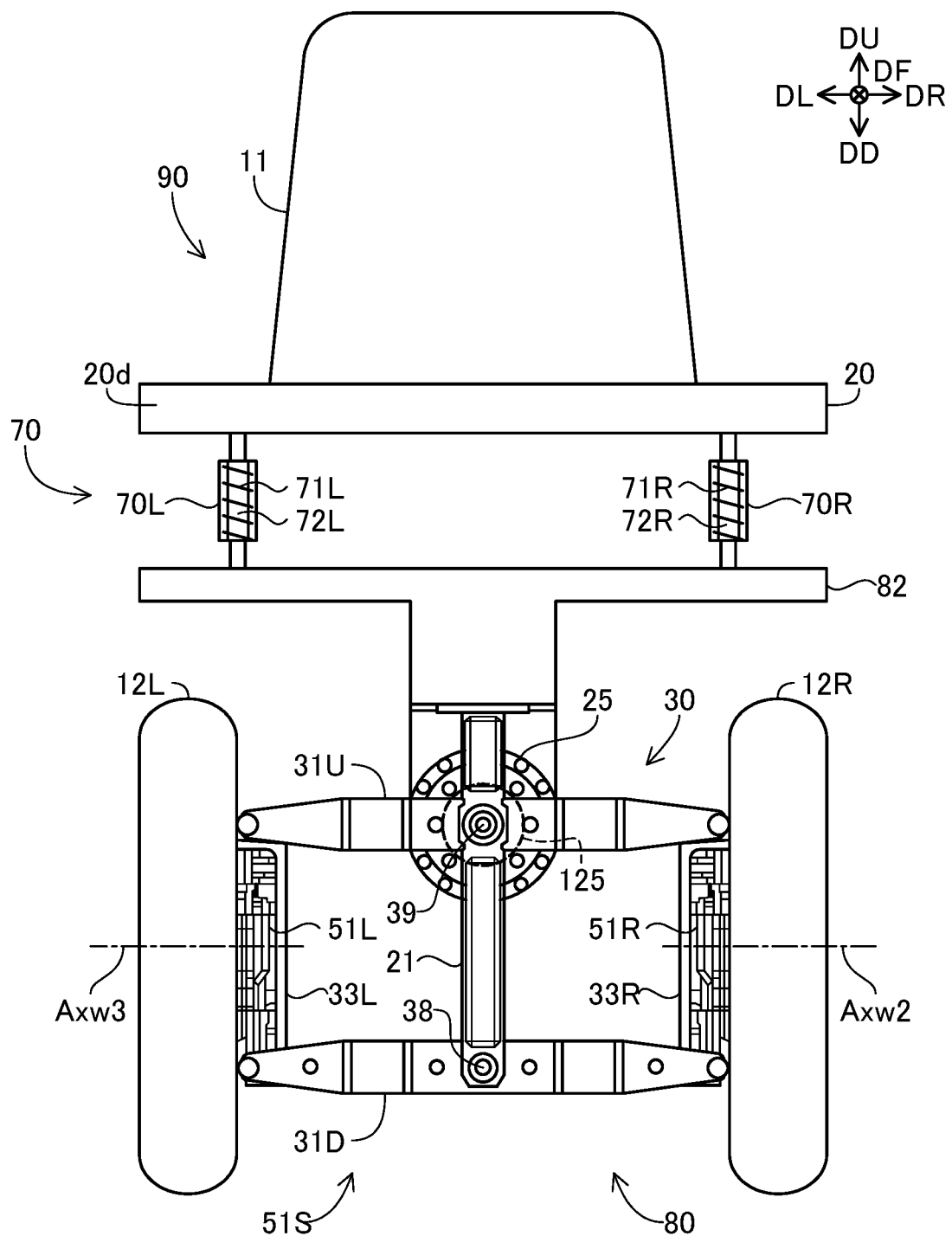
FIG. 2 shows an explanatory diagram illustrating the vehicle 10 as one embodiment.

A1. Configuration of Vehicle 10:

FIGS. 1(A)-1(C) and FIG. 2 show explanatory diagrams which illustrate a vehicle 10 as one embodiment. FIG. 1(A) shows a right side view of the vehicle 10, FIG. 1(B) shows a top view of the vehicle 10, FIG. 1(C) shows a bottom view of the vehicle 10, and FIG. 2 shows a rear view of the vehicle 10. In FIGS. 1(A)-1(C) and FIG. 2, the vehicle 10 is shown that is located on a horizontal ground GL (FIG. 1(A)), and thus does not lean. In FIGS. 1(A)-1(C) and FIG. 2, six directions DF, DB, DU, DD, DR, and DL are shown. A front direction DF is a front direction (i.e direction of forward movement) of the vehicle 10, and a back direction DB is opposite to the front direction DF. An upward direction DU is a vertically upward direction, and a downward direction DD is a vertically downward direction (i.e. a direction opposite to the upward direction DU). The vertically downward direction is the direction of gravity. The right direction DR is a right direction viewed from the vehicle 10 traveling in the front direction DF, and the left direction DL is opposite to the right direction DR. All the directions DF, DB, DR, and DL are horizontal directions. The right and left directions DR and DL are perpendicular to the front direction DF.

In this embodiment, the vehicle 10 is a small single-seater vehicle. The vehicle 10 (FIGS. 1(A) and 1(B)) is a tricycle which has a vehicle body 90, a front wheel 12F, a left rear wheel 12L, and a right rear wheel 12R. The front wheel 12F is an example turn wheel, and is located at the center of the vehicle 10 in its width direction. The turn wheel is a wheel that can turn in the width direction of the vehicle 10 (i.e. to right direction and to left direction). The traveling direction of the turn wheel can turn to right and left relative to the front direction DF. In this embodiment, the front wheel 12F is turnably supported on the vehicle body 90. The rear wheels 12R, 12L are drive wheels. The rear wheels 12R, 12L are spaced apart from each other symmetrically with regard to the center of the vehicle 10 in its width direction.

The vehicle body 90 (FIG. 1(A)) has a main body 20. The main body 20 has a bottom portion 20b, a front wall portion 20a coupled to the bottom portion 20b on the front direction DF side, a rear wall portion 20c coupled to the bottom portion 20b on the back direction DB side, and a support portion 20d which extends from the top of the rear wall portion 20c toward the back direction DB. For example, the main body 20 has a metal frame, and panels attached to the frame.

The vehicle body 90 further has a seat 11 attached on the bottom portion 20b, an accelerator pedal 45 and a brake pedal 46 located on the front direction DF side of the seat 11, a controller 100 and a battery 120 attached on the bottom portion 20b, a front wheel support device 41 attached to the end on the upward direction DU side of the front wall portion 20a, and a steering wheel 41a attached to the front wheel support device 41. Other members (e.g. roof, headlight, etc.) may be attached to the main body 20 although they are not shown in the figures. The vehicle body 90 includes the members attached to the main body 20.

The front wheel support device 41 (FIG. 1(A)) is a device that supports the front wheel 12F turnably about a turning axis Ax1. The front wheel support device 41 has a front fork 17, a bearing 68, and a steering motor 65. The front fork 17, which rotatably supports the front wheel 12F, is a telescopic fork having a coil spring and a shock absorber, for example. The bearing 68 couples the front fork 17 to the front wall portion 20a of the main body 20. The bearing 68 supports the front fork 17 (and thus the front wheel 12F) turnably about the turning axis Ax1 to right and left relative to the vehicle body 90. A turnable range of the front fork 17 may be a predetermined angular range (e.g. a range of less than 180 degrees). For example, the angular range may be limited by the front fork 17 coming into contact with another portion of the vehicle body 90. The steering motor 65 is an electric motor, and is coupled to the front wall portion 20a of the main body 20 and to the front fork 17. The steering motor 65 generates a torque which causes the front fork 17 (and thus the front wheel 12F) to turn in the width direction (i.e. to right direction and to left direction). In this manner, the steering motor 65 is configured to apply a turning torque, which is a torque for controlling the turn of the front wheel 12F in the width direction, on the front wheel 12F (hereinafter sometimes referred to as turning actuator 65).

The steering wheel is a member which can rotate to right and left directions. A rotational angle (sometimes referred to as input angle) of the steering wheel 41a relative to a predetermined rotational position (referred to as forward movement-rotational position) corresponding to forward traveling is example turn input information indicating turning direction and degree of turn. In this embodiment, "input angle=0" indicates forward traveling, "input angle>0" indicates a right turn, and "input angle<0" indicates a left turn. The magnitude (i.e. absolute value) of input angle indicates the degree of turn. The driver can input turn input information by handling the steering wheel 41a.

It should be noted that the steering wheel 41a and the front fork 17 are not coupled mechanically in this embodiment. However, an elastic body (e.g. spring such as coil spring and flat spring, resin such as rubber and silicon) may couple the steering wheel 41a to the front fork 17.

A wheel angle Aw (FIG. 1(B)) is an angle indicating the direction of the front wheel 12F relative to the vehicle body 90. In this embodiment, the wheel angle Aw is an angle of traveling direction D12 of the front wheel 12F relative to the front direction DF. The wheel angle Aw represents an angle about an axis parallel to the upward direction of the vehicle body 90 (which is the same as a vertically upward direction DU when the vehicle body 90 does not lean relative to the vertically upward direction DU). The traveling direction D12 is perpendicular to the rotational axis Axw1 of the front wheel 12F. In this embodiment, "Aw=0" indicates that "direction D12=front direction DF." "Aw>0" indicates that the direction D12 turns toward the right direction DR side (i.e. turning direction=right direction DR). "Aw<0" indicates that the direction D12 turns toward the left direction DL side (i.e. turning direction=left direction DL). The wheel angle Aw represents an angle at which the front wheel 12F turns. If the front wheel 12F is steered, the wheel angle Aw corresponds to a so-called steering angle.

The steering motor 65 is controlled by the controller 100 (FIG. 1(A)). When the turning torque generated by the steering motor 65 is smaller, the direction D12 of the front wheel 12F is allowed to turn to left or right independently of the input angle. The control of steering motor 65 will be discussed in detail later.

An angle CA in FIG. 1(A) is a so-called caster angle. The caster angle CA is an angle between the upward direction of the vehicle body 90 (which is the same as a vertically upward direction DU when the vehicle body 90 does not lean relative to the vertically upward direction DU) and a direction along the turning axis Ax1 toward the vertically upward direction DU side. In this embodiment, the caster angle CA is larger than zero. Accordingly, the direction along the turning axis Ax1 toward the vertically upward direction DU side is tilted diagonally backward.

As shown in FIG. 1(A), in this embodiment, the intersection point P2 between the turning axis Ax1 of the front wheel support device 41 and the ground GL is located on the front direction DF side of the contact center P1 of the front wheel 12F with the ground GL. The distance Lt in the back direction DB between these points P1, P2 is referred to as a trail. A positive trail Lt indicates that the contact center P1 is located on the back direction DB side of the intersection point P2. As shown in FIG. 1(A), FIG. 1(C), the contact center P1 represents a gravity center of contact area Cal between the front wheel 12F and the ground GL. The gravity center of the contact area is a position of gravity center on the assumption that its mass is distributed evenly across the contact area. A contact center PbR of contact area CaR between the right rear wheel 12R and the ground GL, and a contact center PbL of contact area CaL between the left rear wheel 12L and the ground GL are identified in a similar manner.

As shown in FIG. 2, the two rear wheels 12R, 12L are rotatably supported on a rear wheel support 80. The rear wheel support 80 has a link mechanism 30, a lean motor 25 mounted on the top of the link mechanism 30, a first support portion 82 attached onto the top of the link mechanism 30, and a second support portion 83 attached to the front of the link mechanism 30 (FIG. 1(A)). For purposes of illustration, in FIG. 1(A), portions of the rear wheel support 80 which are hidden by the right rear wheel 12R are also depicted in solid lines. In FIG. 1(B), the rear wheel support 80, rear wheels 12R, 12L, and connector rod 75 (described later) which are hidden by the main body 20 are depicted in solid lines. In FIG. 1(A)-FIG. 1(C), the link mechanism 30 is depicted simply.

The first support portion 82 (FIG. 2) includes a plate-like section which extends parallel to the right direction DR on the upward direction DU side of the rear wheels 12R, 12L. The second support portion 83 (FIG. 1(A), FIG. 1(B)) is located on the front direction DF side of the link mechanism 30 between the left rear wheel 12L and the right rear wheel 12R.

The right rear wheel 12R (FIG. 1(B), FIG. 2) is connected to a right drive motor 51R. The right drive motor 51R is an electric motor, and is secured to a right section of the rear wheel support 80. A rotational axis Axw2 (FIG. 2) of the right drive motor 51R is the same as that of the right rear wheel 12R. The configurations of the left rear wheel 12L and the left drive motor 51L are similar to those of the right rear wheel 12R and the right drive motor 51R, respectively.

These drive motors 51L, 51R are in-wheel motors which directly drive the rear wheels 12R, 12L. Hereinafter, the left drive motor 51L and the right drive motor 51R may be collectively referred to as drive system 51S.

FIG. 1(A)-FIG. 1(C), FIG. 2 show a state where the vehicle body 90 does not lean but stands upright on the horizontal ground GL (that is, a state where a roll angle Ar described later is equal to zero). Hereinafter, this state is referred to as upright state. In this upright state, a rotational axis Axw3 (FIG. 2) of the left rear wheel 12L and the rotational axis Axw2 of the right rear wheel 12R are located on the same line, and are parallel to the right direction DR.

The link mechanism 30 (FIG. 2) is a so-called parallel linkage. The link mechanism 30 has three longitudinal link members 33L, 21, 33R arranged in order toward the right direction DR, and two lateral link members 31U, 31D arranged in order toward the downward direction DD. When the vehicle body 90 stands upright without leaning on the horizontal ground GL, the longitudinal link members 33L, 21, 33R are parallel to the vertical direction, and the lateral link members 31U, 31D are parallel to the horizontal direction. The two longitudinal link members 33L, 33R, and the two lateral link members 31U, 31D form a parallelogram link mechanism. The center longitudinal link member 21 couples the centers of the lateral link members 31U, 31D. These link members 33L, 33R, 31U, 31D, 21 are mutually coupled rotatably. In this embodiment, their rotational axes are parallel to the front direction DF. The link members coupled with each other may relatively rotate about the rotational axis within a predetermined angular range (e.g. a range of less than 180 degrees). The left drive motor 51L is attached to the left longitudinal link member 33L. The right drive motor 51R is attached to the right longitudinal link member 33R. On the top of the center longitudinal link member 21, the first support portion 82 and second support portion 83 (FIG. 1(A)) are secured. The link members 33L, 21, 33R, 31U, 31D, and the support portions 82, 83 are made of metal, for example.

In this embodiment, the link mechanism 30 has bearings for rotatably coupling link members. For example, a bearing 38 rotatably couples the lower lateral link member 31D to the center longitudinal link member 21, and a bearing 39 rotatably couples the upper lateral link member 31U to the center longitudinal link member 21. A plurality of other link members are also coupled by bearings although they are not specifically described here.

The lean motor 25, which is an example lean actuator configured to actuate the link mechanism 30, is an electric motor in this embodiment. The lean motor 25 is coupled to the center longitudinal link member 21 and to the upper lateral link member 31U. The rotational axis of the lean motor 25 is the same as that of the bearing 39, and is located at the center of the vehicle 10 in its width direction. The lean motor 25 rotates the upper lateral link member 31U relative to the center longitudinal link member 21. This causes the vehicle 10 to lean in its width direction (i.e. to right direction or to left direction). Such a leaning motion is also referred to as roll motion.

Figure 3:
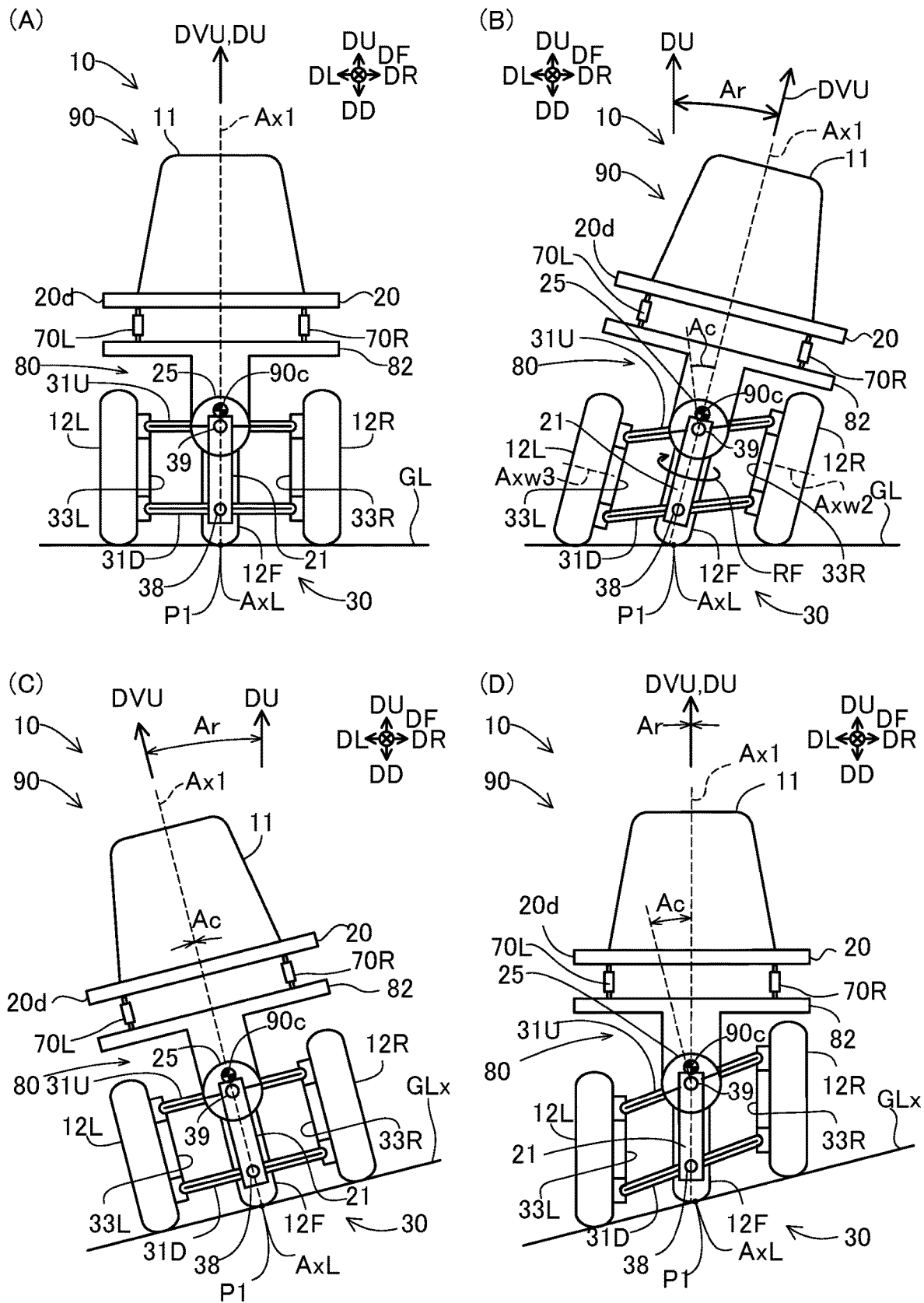
FIGS. 3(A), (B) are schematic diagrams illustrating states of the vehicle 10 on a horizontal ground GL.
FIG. 3(C), (D) show simplified rear views of the vehicle 10.

FIG. 3(A), FIG. 3(B) show schematic diagrams of the states of the vehicle 10 on the horizontal ground GL. These figures show simplified rear views of the vehicle 10. FIG. 3(A) shows the state in which the vehicle 10 stands upright while FIG. 3(B) shows the state in which the vehicle 10 leans. As shown in FIG. 3(A), when the upper lateral link member 31U is perpendicular to the center longitudinal link member 21, all of the wheels 12F, 12R, 12L stand upright relative to the horizontal ground GL. Also, the whole vehicle 10 including the vehicle body 90 stands upright relative to the ground GL. A vehicle body upward direction DVU in the figure represents the upward direction of the vehicle body 90. With the vehicle 10 not leaning, the vehicle body upward direction DVU is the same as the upward direction DU. In this embodiment, an upward direction predetermined for the vehicle body 90 is used as the vehicle body upward direction DVU.

As shown in the rear view of FIG. 3(B), the center longitudinal link member 21 rotates clockwise relative to the upper lateral link member 31U, and thereby the right rear wheel 12R moves toward the vehicle body upward direction DVU side while the left rear wheel 12L moves toward the opposite side, relative to the vehicle body 90. As a result, these wheels 12F, 12R, 12L lean to the right direction DR side relative to the ground GL while all of the wheels 12F, 12R, 12L have contact with the ground GL. Also, the whole vehicle 10 including the vehicle body 90 leans to the right direction DR side relative to the ground GL. The center longitudinal link member 21 rotates counterclockwise relative to the upper lateral link member 31U, and thereby the vehicle 10 leans to the left direction DL side although this is not illustrated.

In this manner, when the upper lateral link member 31U is tilted relative to the center longitudinal link member 21, one of the right rear wheel 12R or left rear wheel 12L moves to the vehicle body upward direction DVU side relative to the vehicle body 90 while the other moves in an opposite direction side to the vehicle body upward direction DVU relative to the vehicle body 90. The link mechanism 30 can change the relative position between the left rear wheel 12L and the right rear wheel 12R in the vehicle body upward direction DVU. As a result, the vehicle body 90 leans relative to the ground GL.

It should be noted that the lateral link members 31U, 31D are rotatably supported on the vehicle body 90 (via the center longitudinal link member 21, the first support portion 82, and a suspension system 70 described later). And, the rear wheels 12R, 12L are connected to the vehicle body 90 via a plurality of members including the lateral link members 31U, 31D. Accordingly, the distances between the rear wheels 12R, 12L and the vehicle body 90 in the vehicle body upward direction DVU are changed by rotating the lateral link members 31U, 31D relative to the vehicle body 90. The rotational axes (bearings 39, 38) of the lateral link members 31U, 31D are located between the right rear wheel 12R and the left rear wheel 12L. Accordingly, when the lateral link members 31U, 31D rotate, the direction of movement of the right rear wheel 12R is opposite to that of the left rear wheel 12L.

In FIG. 3(B), the vehicle body upward direction DVU is tilted in the right direction DR side relative to the upward direction DU. Hereinafter, when the vehicle 10 is viewed in the front direction DF, the angle between the upward direction DU and the vehicle body upward direction DVU is referred to as roll angle Ar or lean angle Ar. Where "Ar>0" indicates a lean to the right direction DR side while "Ar<0" indicates a lean to the left direction DL side. When the vehicle 10 leans, the whole vehicle 10 including the vehicle body 90 leans to substantially the same direction. Therefore, the roll angle Ar of the vehicle body 90 can be considered as the roll angle Ar of the vehicle 10.

A control angle Ac of the link mechanism 30 is also shown in FIG. 3(B). The control angle Ac represents an angle between the orientations of the upper lateral link member 31U and center longitudinal link member 21. "Ac=0" indicates that the center longitudinal link member 21 is perpendicular to the upper lateral link member 31U. "Ac>0" indicates that the center longitudinal link member 21 is tilted clockwise relative to the upper lateral link member 31U, as shown in the rear view of FIG. 3(B). "Ac<0" indicates that the center longitudinal link member 21 is tilted counterclockwise relative to the upper lateral link member 31U although this state is not illustrated. As shown, the control angle Ac is approximately the same as the roll angle Ar when the vehicle 10 is located on the horizontal ground GL (i.e. the ground GL perpendicular to the vertically upward direction DU).

In FIG. 3(A), FIG. 3(B), an axis AxL on the ground GL is a lean axis AxL. The link mechanism 30 and the lean motor 25 can cause the vehicle 10 to lean to right and left about the lean axis AxL. Hereinafter, the lean axis AxL may be referred to as roll axis. In this embodiment, the roll axis AxL is a straight line which passes through a contact center P1 between the front wheel 12F and the ground GL, and which is parallel to the front direction DF. The link mechanism 30 is an example lean device configured to lean the vehicle body 90 in the width direction of the vehicle 10 (sometimes referred to as lean device 30).

FIG. 3(C), FIG. 3(D) show simplified rear views of the vehicle 10 similarly to FIG. 3(A), FIG. 3(B). In FIG. 3(C), FIG. 3(D), the ground GLx is inclined relative to the vertically upward direction DU (higher on the right side, and lower on the left side). FIG. 3(C) shows a state where the control angle Ac is equal to zero. In this state, all of the wheels 12F, 12R, 12L stand upright relative to the ground GLx. And, the vehicle body upward direction DVU is perpendicular to the ground GLx, and is tilted in the left direction DL side relative to the vertically upward direction DU.

FIG. 3(D) shows a state where the roll angle Ar is equal to zero. In this state, the upper lateral link member 31U is approximately parallel to the ground GLx, and is tilted counterclockwise relative to the center longitudinal link member 21. The wheels 12F, 12R, 12L are tilted relative to the ground GL.

In this manner, the roll angle Ar of the vehicle body 90 can differ from the control angle Ac of the link mechanism 30 when the ground GLx is inclined.

The rear wheel support 80 has a lock mechanism (not shown) for locking the link mechanism 30. The control angle Ac is fixed by actuating the lock mechanism. For example, the control angle Ac is fixed to zero when the vehicle 10 is parked.

In this embodiment, the main body 20 is coupled to the rear wheel support 80 via the suspension system 70 and the connector rod 75, as shown in FIG. 1(B), FIG. 2. The suspension system 70 has a left suspension 70L and a right suspension 70R. The suspensions 70L, 70R each are coupled to the support portion 20D of the main body 20 and to the first support portion 82 of the rear wheel support 80. The suspensions 70L, 70R have coil springs 71L, 71R and shock absorbers 72L, 72R, respectively, and are telescopic. The suspension system 70 allows relative movement between the rear wheel support 80 and the main body 20.

The connector rod 75 is a rod which extends in the front direction DF as shown in FIG. 1(A), FIG. 1(B). The connector rod 75 is located at the center of the vehicle 10 in its width direction. The end of the connector rod 75 on the front direction DF side is rotatably coupled to the rear wall portion 20c of the main body 20 (e.g. via a ball-and-socket joint). The end of the connector rod 75 on the back direction DB side is rotatably coupled to the second support portion 83 of the rear wheel support 80 (e.g. via a ball-and-socket joint).

Figure 4:
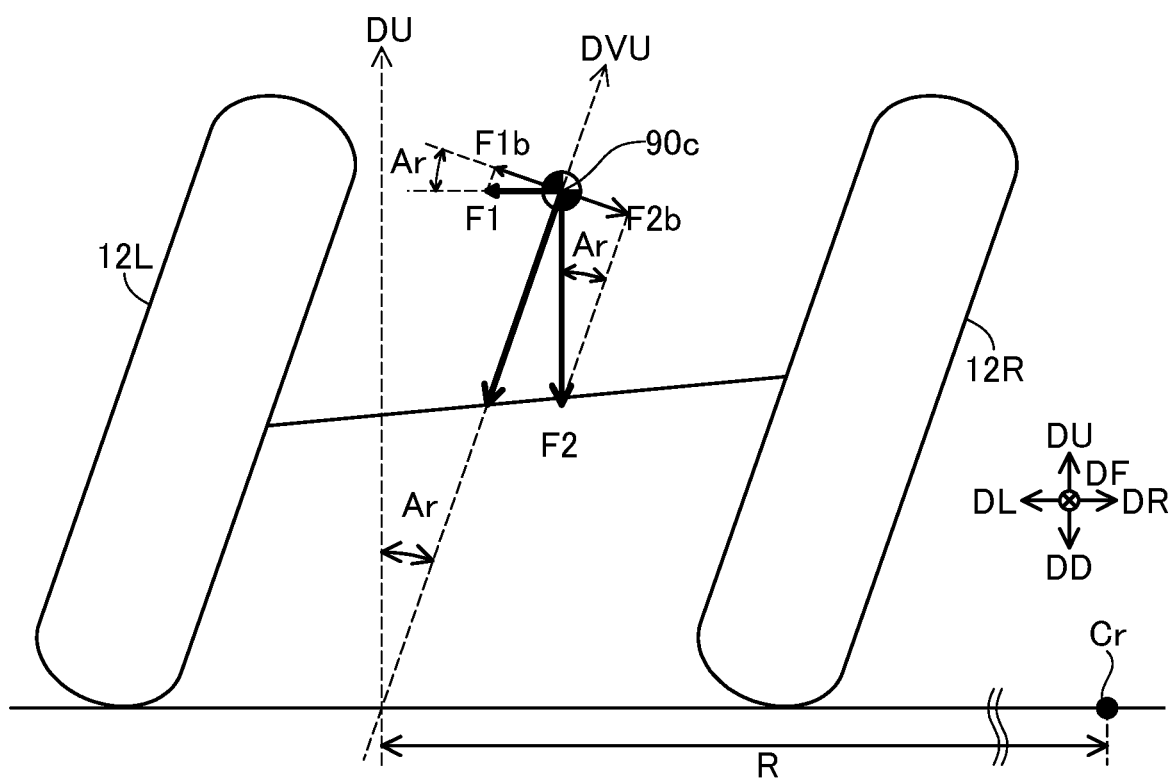
FIG. 4 is an explanatory diagram illustrating a balance of forces during turning.

FIG. 4 shows an explanatory diagram illustrating a balance of forces during turning. This figure shows a rear view of the rear wheels 12R, 12L when the turning direction is the right direction. As described later, when the turning direction is the right direction, the controller 100 (FIG. 1(A)) may control the steering motor 65 and the lean motor 25 so that the rear wheels 12R, 12L (and thus the vehicle body 90) lean to the right direction DR relative to the ground GL.

A gravity center 90c is shown in FIG. 4. The gravity center 90c is a gravity center of the vehicle body 90. The gravity center 90c of the vehicle body 90 is a gravity center when the vehicle body 90 carries an occupant (and possibly a load).

A first force F1 in the figure is a centrifugal force acting on the vehicle body 90. A second force F2 is a gravity acting on the vehicle body 90. Hereinafter, assume that the force acting on the vehicle body 90 acts on the gravity center 90c of the vehicle body 90. Here, the mass of the vehicle body 90 is M (kg), the acceleration of gravity is g (about 9.8 m/s$^2$), the roll angle of the vehicle 10 relative to the vertical direction is Ar (degrees), the velocity of the vehicle 10 (i.e. vehicle velocity) during turning is V (m/s), and the turning radius is R (m). The first force F1 and the second force F2 are expressed in Equations 1 and 2, respectively:

$$F1=(M*V^2)/R \quad \text{(Equation 1)}$$

$$F2=M*g \quad \text{(Equation 2)}$$

Where * represents a multiplication sign (the same applies below).

In addition, a force F1b in the figure is a component of the first force F1 in a direction perpendicular to the vehicle body upward direction DVU. A force F2b is a component of the second force F2 in a direction perpendicular to the vehicle body upward direction DVU. The force F1b and the force F2b are expressed in Equations 3 and 4, respectively:

$$F1b=F1*\cos(Ar) \quad \text{(Equation 3)}$$

$$F2b=F2*\sin(Ar) \quad \text{(Equation 4)}$$

Where "cos( )" is a cosine function, and "sin( )" is a sine function (the same applies below).

The force F1b is a component which causes the vehicle body upward direction DVU to be rotated to the left direction DL side while the force F2b is a component which causes the vehicle body upward direction DVU to be rotated to the right direction DR side. When the vehicle 10 continues to turn with the roll angle Ar (and furthermore the velocity V and turning radius R) maintained, the relationship between F1b and F2b is expressed in the following equation 5:

$$F1b=F2b \quad \text{(Equation 5)}$$

By substituting Equations 1-4 as discussed above into Equation 5, the turning radius R is expressed in Equation 6:

$$R=V^2/(g*\tan(Ar)) \quad \text{(Equation 6)}$$

Where "tan( )" is a tangent function (the same applies below).

Equation 6 is true independently of the mass M of the vehicle body 90. Equation 6a below, which is obtained by substituting "Ar" in Equation 6 with a parameter Ara (in this case, absolute value of roll angle Ar) representing the magnitude of the roll angle Ar without distinction between the right and left directions, is true regardless of the lean direction of the vehicle body 90:

$$R=V^2/(g*\tan(Ara)) \quad \text{(Equation 6a)}$$

Figure 5:
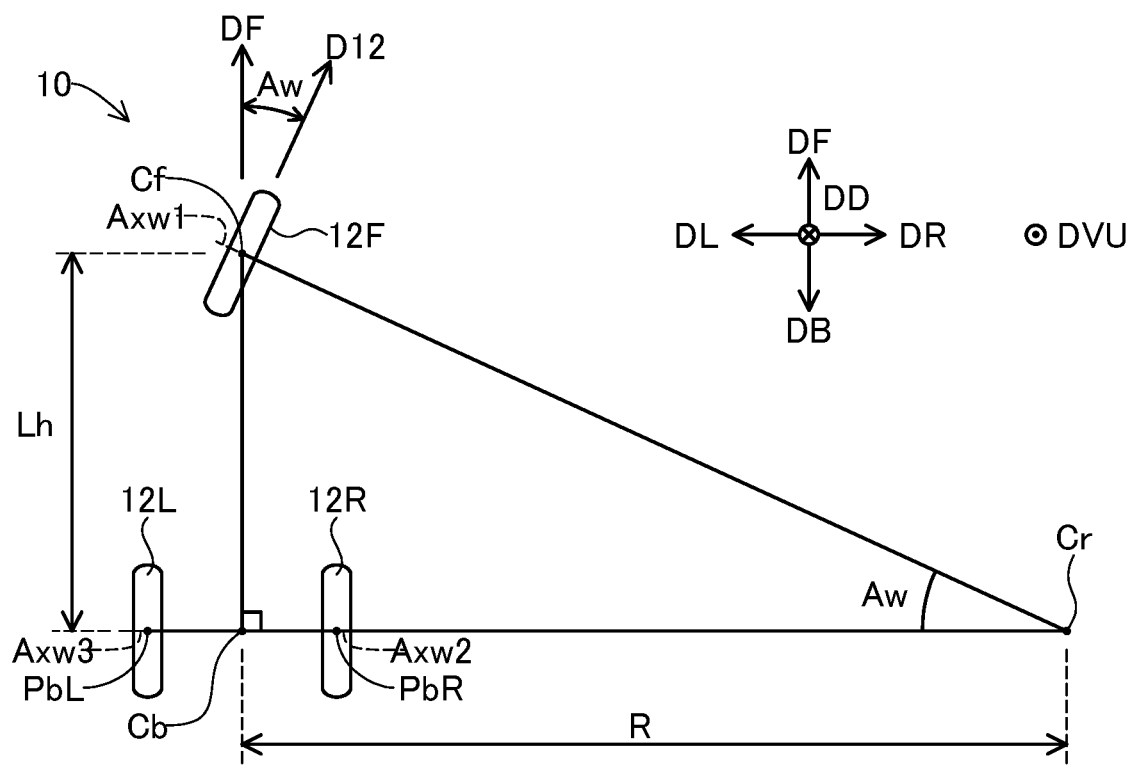
FIG. 5 is an explanatory diagram showing a simplified relationship between a wheel angle Aw and a turning radius R.

FIG. 5 is an explanatory diagram showing a simplified relationship between the wheel angle Aw and the turning radius R. This figure shows the wheels 12F, 12R, 12L viewed in the downward direction DD. For ease of explanation, assume that the roll angle Ar is equal to zero (i.e. The vehicle body upward direction DVU is parallel to the downward direction DD). In the figure, the traveling direction D12 of the front wheel 12F turns to the right direction DR, and thus the vehicle 10 turns to the right direction DR. A front center Cf in the figure is the contact center P1 (FIG. 1(C)) of the front wheel 12F. The front center Cf is located on a line including the rotational axis Axw1 of the front wheel 12F when the vehicle 10 is viewed in the downward direction DD. A rear center Cb is a center between the contact centers PbR, PbL (FIG. 1(C)) of the two rear wheels 12R, 12L. The rear center Cb is located at the middle between the rear wheels 12R, 12L on a line including the rotational axes Axw2, Axw3 of the rear wheels 12R, 12L when the vehicle 10 standing upright is viewed in the downward direction DD. A center Cr located on the right direction DR side of the vehicle 10 is a turning center. The turning motion of the vehicle 10 includes revolution of the vehicle 10 and rotation of the vehicle 10. The center Cr is a center of revolution (sometimes referred to as revolution center Cr). It should be noted that the front wheel 12F is a turn wheel instead of the rear wheels 12R, 12L in this embodiment. Accordingly, the rotation center is approximately the same as the rear center Cb. A wheelbase Lh is the distance between the front center Cf and the rear center Cb in the front direction DF. As shown in FIG. 1(A), the wheelbase Lh is the same as the distance between the rotational axis Axw1 of the front wheel 12F and the rotational axes Axw2, Axw3 of the rear wheels 12R, 12L in the front direction DF.

As shown in FIG. 5, the front center Cf, rear center Cb, and revolution center Cr form a right angled triangle. The internal angle of the vertex Cb is 90 degrees. The internal angle of the vertex Cr is equal to the wheel angle Aw. Therefore, the relationship between the wheel angle Aw and the turning radius R is expressed in Equation 7:

$$Aw = \arctan(Lh/R) \qquad \text{(Equation 7)}$$

Where "arctan( )" is an inverse function of tangent function (the same applies below).

Equation 6, Equation 6a, and Equation 7 described above are true when the vehicle 10 is turning while the velocity V and the turning radius R remain unchanged. Specifically, Equation 6, Equation 6a, and Equation 7 represent a static state where the force F1b (FIG. 4) due to centrifugal force and the force F2b due to gravity are in equilibrium. Equation 7 can be used as a good approximate equation which represents the relationship between the wheel angle Aw and the turning radius R. It should be noted that there are a variety of differences between the actual behavior of the vehicle 10 and the simplified behavior in FIG. 5. For example, the actual force which acts on the vehicle changes dynamically. By controlling the vehicle 10 taking the dynamic change in the force into account, the difference can be reduced between the intended movement of the vehicle 10 by the control and the actual movement of the vehicle 10. In this embodiment, the controller 100 controls the vehicle 10 taking a roll torque acting on the vehicle body 90 into account. The roll torque will be described below.

Figure 6:
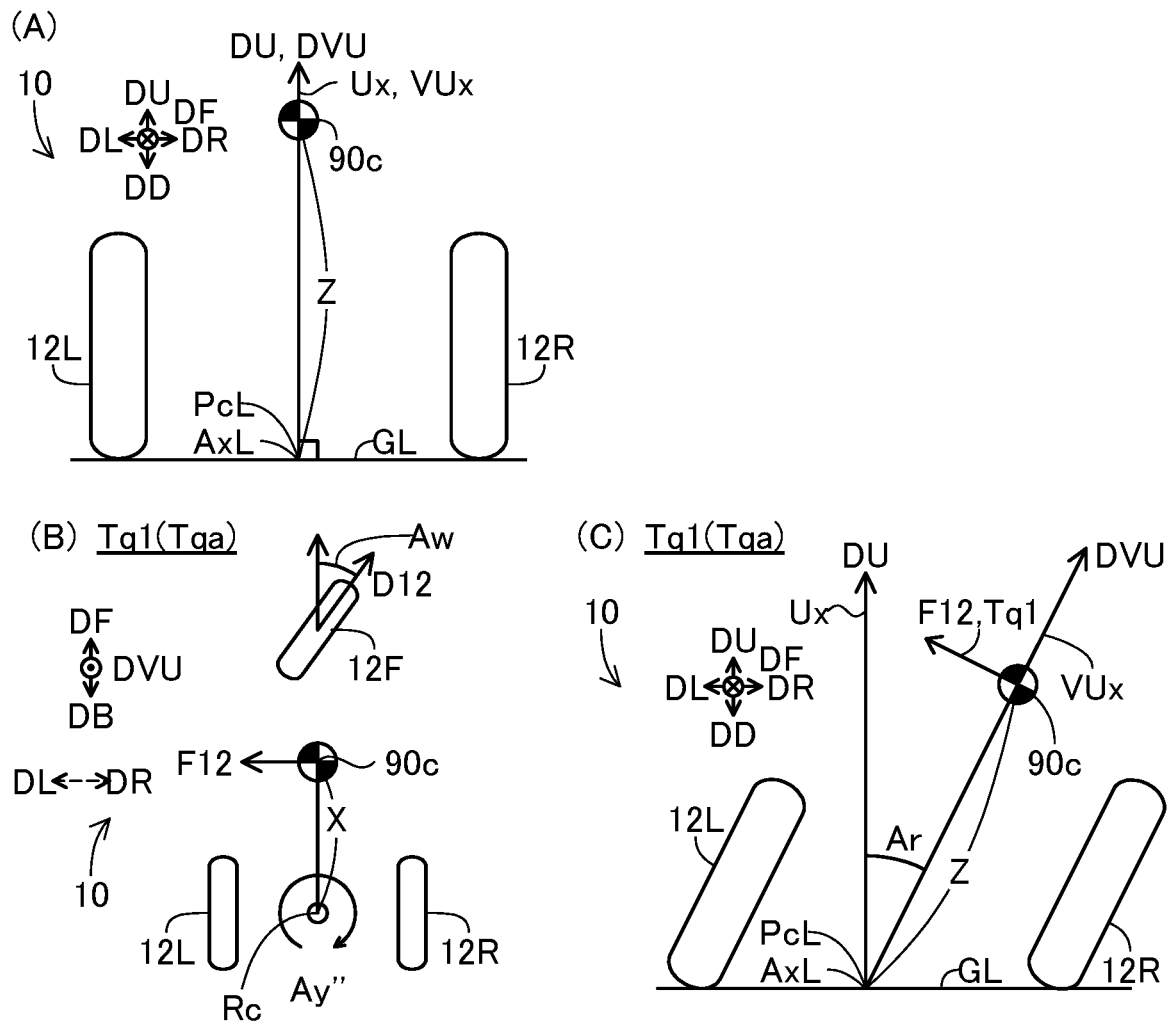
FIGS. 6(A)-(C) are explanatory diagrams of a roll torque due to yaw angular acceleration of the vehicle 10.

FIG. 6(A)-FIG. 6(C) are explanatory diagrams of roll torque due to yaw angular acceleration of the vehicle 10. FIG. 6(A), FIG. 6(C) are explanatory diagrams of the rear wheels 12R, 12L, and the gravity center 90c when viewed in the front direction DF. Here, the vehicle 10 is located on a horizontal ground GL. FIG. 6(A) shows a upright state (Ar=0). FIG. 6(C) shows a state where the vehicle body 90 leans to the right direction DR (Ar>0). FIG. 6(B) is an explanatory diagram of the wheels 12F, 12R, 12L, and the gravity center 90c when viewed in a direction opposite to the vehicle body upward direction DVU. In FIG. 6(B), the right direction DR and the left direction DL are shown for reference. When the roll angle Ar is not equal to zero, these directions DR, DL are not perpendicular to the vehicle body upward direction DVU, but are tilted relative to the direction.

A variable Z (FIG. 6(A), FIG. 6(C)) is a distance between the roll axis AxL and the gravity center 90c of the vehicle body 90. In this embodiment, the roll axis AxL is located on the ground GL. Accordingly, the distance Z is the same as a distance in the vertically upward direction DU between the ground GL and the gravity center 90c in the upright state (FIG. 6(A)). In the upright state, when the gravity center 90c is projected toward the vertically downward direction DD onto the ground, its projected point PcL is located on the roll axis AxL. A vertical axis Ux is an axis that passes through the projected point PcL and that is parallel to the vertically upward direction DU. A vehicle upward axis VUx is an axis that passes through the projected point PcL and that is parallel to the vehicle body upward direction DVU. The vehicle upward axis VUx passes through the projected point PcL and the gravity center 90c. As shown in FIG. 6(C), an angle between the vehicle upward axis VUx and the vertical axis Ux is the roll angle Ar.

In FIG. 6(B), a rotation center Rc is shown. In this embodiment, the front wheel 12F is a turn wheel instead of the rear wheels 12R, 12L. The direction of the moving vehicle 10 (e.g. the front direction DF) changes toward right or left about the proximity of the rear wheels 12R, 12L. When the wheels 12F, 12R, 12L does not slip relative to the ground, the rotation center Rc can be located on the center (specifically, the rear center Cb in FIG. 5) between the rear wheels 12R, 12L. When the wheels 12F, 12R, 12L slip relative to the ground, the rotation center Rc can be displaced from the rear center Cb. In any event, the rotation center Rc is located in the proximity of the center between the rear wheels 12R, 12L. Typically, the gravity center 90c of the vehicle body 90 is located close to the central portion of the vehicle body 90 in the top view of FIG. 6(B). Accordingly, the gravity center 90c of the vehicle body 90 is located away from the rotation center Rc toward the front direction DF side. A distance X in this figure represents a positional difference (distance) in the front direction DF between the gravity center 90c and the rotation center Rc.

A variable Ay" (FIG. 6(B)) is a yaw angular acceleration of the vehicle 10 (the variable Ay represents a yaw angle). In this specification, a single quotation mark ['] attached to a variable indicates a first derivative with regard to time. A double quotation mark ["] indicates a second derivative with regard to time. For example, Ay" represents a second derivative of a yaw angle with regard to time (i.e. yaw angular acceleration).

In this embodiment, the yaw angular acceleration Ay" is a yaw angular acceleration about an axis parallel to the vehicle body upward direction DVU. The yaw angular acceleration Ay" represents an angular acceleration of rotation of the vehicle 10 about the rotation center Rc. Here, an axis perpendicular to the ground is referred to as ground perpendicular axis. The yaw angular acceleration Ay" represents a component about the axis parallel to the vehicle body upward direction DVU in the yaw angular acceleration about the ground perpendicular axis. In the top view of FIG. 6(B), when the direction of the yaw angular acceleration Ay" is clockwise, the yaw angular velocity Ay' changes so that the right turn increases in degree. Hereinafter, in the top view, when the direction of the yaw angular acceleration Ay" is clockwise, the direction of the yaw angular acceleration Ay" will be referred to as right direction. In the top view, when the direction of the yaw angular acceleration Ay" is counterclockwise, the direction of the yaw angular acceleration Ay" will referred to as left direction.

The gravity center 90c of the vehicle body 90 is located away from the rotation center Rc by the distance X toward the front direction DF side. Accordingly, the vehicle body 90 is subject to a component F12 of inertial force in a direction opposite to that of the yaw angular acceleration Ay" (referred to as inertial force component F12). The direction of this inertial force component F12 is perpendicular to the vehicle body upward direction DVU. Also, in this embodiment, the direction from the rotation center Rc to the gravity center 90c is approximately parallel to the front direction DF in the top view of FIG. 6(B). Accordingly, the direction of the inertial force component F12 is approximately perpendicular to the front direction DF. The magnitude of the inertial force component F12 is represented by a product of the mass M and an acceleration A90 of the gravity center 90c due to the yaw angular acceleration Ay". The acceleration A90 is represented by a product of the distance X and the yaw angular acceleration Ay". Accordingly, the magnitude of the inertial force component F12 is calculated by a formula [M*X*Ay"]. In the top view of FIG. 6(B), the direction of the yaw angular acceleration Ay", i.e. the direction of change in the yaw angular velocity Ay', is clockwise. In this case, the direction of the inertial force component F12 faces the left direction DL side.

In FIG. 6(C), the inertial force component 12 is shown. The inertial force component F12 causes the vehicle body 90 to roll. The magnitude of a roll torque Tq1 due to the inertial force component F12 is calculated by multiplying the distance Z by the magnitude of the inertial force component F12 (Tq1=Z*F12=M*X*Z*Ay"). The direction of the roll torque Tq1 (referred to as yaw angular acceleration roll direction) is right direction or left direction, and is opposite to the direction of the yaw angular acceleration Ay". For example, when the direction of the yaw angular acceleration Ay" is the direction of right turn, the direction of the roll torque Tq1 is the left direction.

When the front wheel 12F turns, the wheel angle Aw changes. When the wheel angle Aw changes, the yaw angular velocity Ay' changes, and therefore the magnitude of the yaw angular acceleration Ay" is larger than zero. Due to non-zero yaw angular acceleration Ay", the roll torque Tq1 acts on the vehicle body 90. In this manner, due to the change in wheel angle Aw (the angular velocity Aw' of the wheel angle Aw), the roll torque is generated (hereinafter sometimes referred to as first type roll torque).

The magnitude of the first type roll torque can be determined as follows. First, a relationship between the wheel angle Aw and the yaw angular acceleration Ay" will be described. As described with reference to FIG. 5, the front center Cf, rear center Cb, and revolution center Cr form a right angled triangle. When the roll angle Ar is equal to zero, the vehicle body upward direction DVU is parallel to the vertically downward direction DD. Accordingly, the positions of the points Cf, Cb, Cr shown in FIG. 5 are the same as positions when the points Cf, Cb, Cr are viewed in a direction parallel to the vehicle body upward direction DVU. The traveling direction D12 of the front wheel 12F is assumed to be mapped to the wheel angle Aw regardless of the roll angle Ar. Accordingly, when the points Cf, Cb, Cr are viewed in the direction parallel to the vehicle body upward direction DVU, the front center Cf, rear center Cb, and revolution center Cr form a right angled triangle regardless of the roll angle Ar. Among three sides of this right angled triangle, the length of the side which connects the rotation center Cr and the rear center Cb is denoted as Rx. In this case, Equation A1 is true.

$$\tan(Aw)=Lh/Rx \quad \text{(Equation A1)}$$

Equation A1 is transformed to Equation A2.

$$1/Rx=\tan(Aw)/Lh \quad \text{(Equation A2)}$$

When the vehicle 10 is turning with the yaw angular velocity Ay', Equation A3 is true.

$$V=Rx*Ay' \quad \text{(Equation A3)}$$

Equation A3 is transformed to Equation A4.

$$Ay'=V/Rx \quad \text{(Equation A4)}$$

By substituting Equation A2 into Equation A4, Equation A5 is derived.

$$Ay'=(V*\tan(Aw))/Lh \quad \text{(Equation A5)}$$

By differentiating both sides of Equation A5 with respect to time, Equation A6 is derived.

$$Ay''=(V/Lh)*(1/\cos^2(Aw))*Aw' \quad \text{(Equation A6)}$$

As described with reference to FIG. 6(B), FIG. 6(C), due to the yaw angular acceleration Ay", the roll torque acts on the vehicle body 90. The first type roll torque is a roll torque due to the yaw angular acceleration Ay" in Equation A6. The magnitude of the first type roll torque Tqa is derived by substituting Equation A6 into the yaw angular acceleration Ay" of the formula for the magnitude of roll torque Tq1 shown in FIG. 6(C), and is expressed by Equation A7.

$$Tqa = M*X*Z*Ay'' = (M*X*Z*V*Aw')/(Lh*\cos^2(Aw)) \quad \text{(Equation A7)}$$

As described above, the angular velocity Aw' of the wheel angle Aw can be used to apply the first type roll torque Tqa on the vehicle body 90. The direction of the first type roll torque Tqa (sometimes referred to as turn roll direction) is opposite to that of the angular velocity Aw' of the wheel angle Aw. For example, when the wheel angle Aw turns in the right direction DR (Aw'>0), the direction of the first type roll torque Tqa is the left direction.

In addition, Equation A8 is derived from Equation A7.

$$Aw'=(Tqa*Lh*\cos^2(Aw))/(M*X*Z*V) \quad \text{(Equation A8)}$$

Equation A8 represents the magnitude of the angular velocity Aw' of the wheel angle Aw required to generate the first type roll torque Tqa.

It should be noted that the steering motor 65 can change the wheel angle Aw and thus its angular velocity Aw' by generating the turning torque. As indicated in Equation A6, the angular velocity Aw' of the wheel angle Aw changes the yaw angular acceleration Ay" of the vehicle 10. In this manner, the turning torque is an example force which changes the yaw angular acceleration Ay". The steering motor 65 is an example force generator configured to generate a force which changes the yaw angular acceleration Ay" (sometimes referred to as force generator 65).

Figure 7:
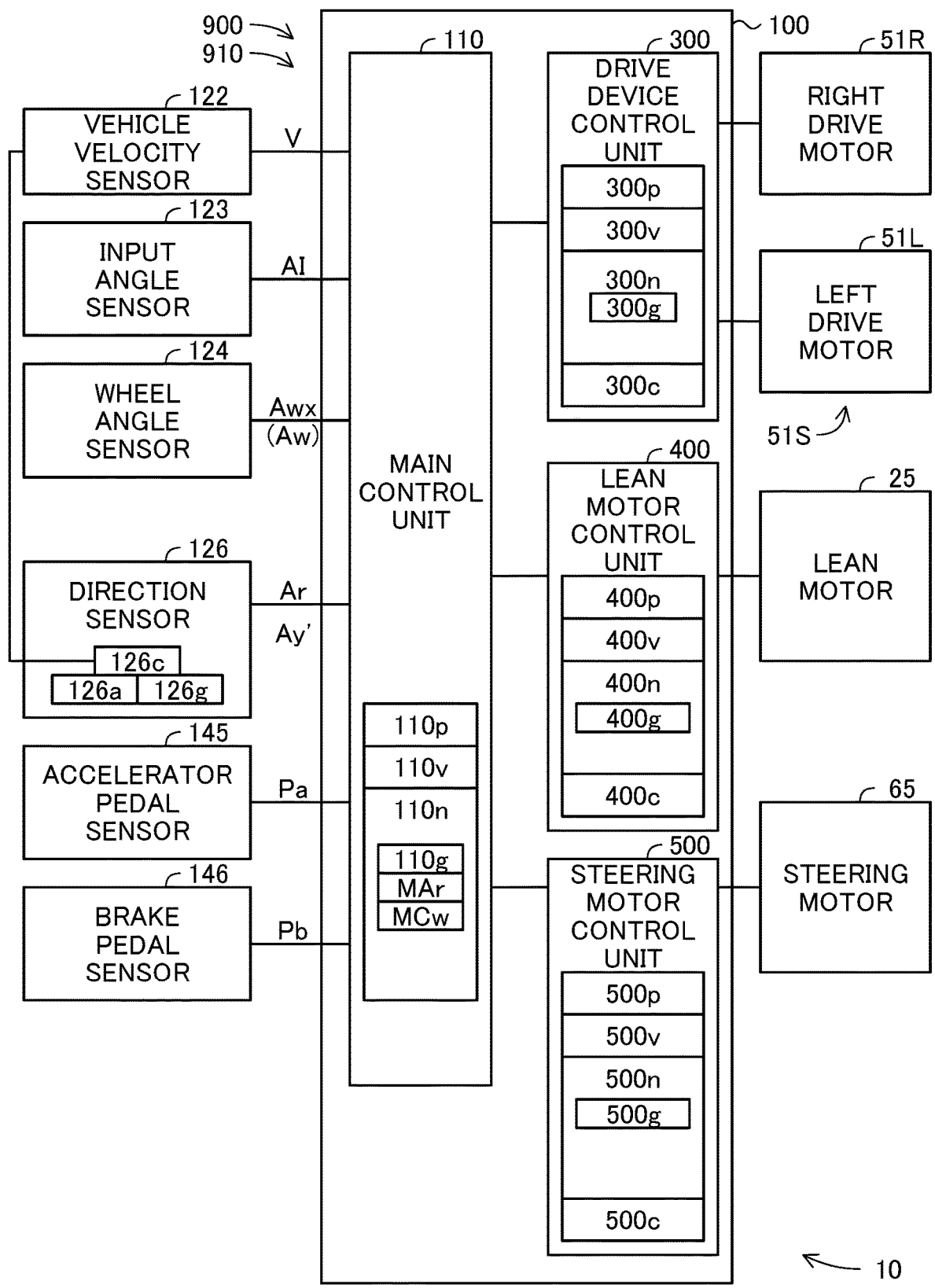
FIG. 7 is a block diagram showing a configuration relating to control of the vehicle 10.

FIG. 7 is a block diagram showing the configuration relating to control of the vehicle 10. The vehicle 10 has a vehicle velocity sensor 122, an input angle sensor 123, a wheel angle sensor 124, a direction sensor 126, an accelerator pedal sensor 145, a brake pedal sensor 146, a controller 100, a right drive motor 51R, a left drive motor 51L, a lean motor 25, and a steering motor 65.

The vehicle velocity sensor 122 is a sensor for detecting a vehicle velocity of the vehicle 10. In this embodiment, the vehicle velocity sensor 122 is attached on the lower end of the front fork 17 (FIG. 1(A)) to detect a rotational rate of the front wheel 12F. The rotational rate is correlated with the velocity (sometimes referred to as vehicle velocity) of the vehicle 10. Accordingly, the sensor 122 for detecting the rotational rate can be considered to detect the vehicle velocity.

The input angle sensor 123 is a sensor for detecting an orientation of the steering wheel 41a (i.e. input angle). In this embodiment, the input angle sensor 123 is attached to the steering wheel 41a (FIG. 1(A)). The input angle sensor 123 is an example turn input information acquisition device configured to acquire an input angle AI (an example turn input information).

The wheel angle sensor 124 is a sensor for detecting a wheel angle of the front wheel 12F. In this embodiment, the wheel angle sensor 124 is attached to the front wall portion 20a of the main body 20 (FIG. 1(A)). The wheel angle sensor 124 detects the wheel angle about the turning axis Ax1 (sometimes referred to as detected angle Awx). The turning axis Ax1 rolls with the vehicle body 90. In addition, a direction parallel to the turning axis Ax1 (sometimes referred to as direction of turning axis Ax1) can differ from the vehicle body upward direction DVU. In this case, the wheel angle Aw about an axis parallel to the vehicle body upward direction DVU is calculated by correcting the detected angle Awx using a difference between the direction of the turning axis Ax1 and the vehicle body upward direction DVU. For example, if the caster angle CA relative to the vehicle body upward direction DVU is not equal to zero, the wheel angle Aw may be calculated according to an approximate equation 'Aw=cos(CA)*Awx.' The same is true if a camber angle relative to the vehicle body upward direction DVU is not equal to zero.

The direction sensor 126 determines the roll angle Ar and the yaw angular velocity. In this embodiment, the direction sensor 126 is secured to the vehicle body 90 (FIG. 1(A) (specifically, to the rear wall portion 20c). In this embodiment, the direction sensor 126 also includes an acceleration sensor 126a, a gyroscope sensor 126g, and a control unit 126c. The acceleration sensor is a sensor that detects acceleration in any direction, for example, triaxial acceleration sensor. Hereinafter, a direction of acceleration detected by the acceleration sensor 126a will be referred to as detected direction. With the vehicle 10 stopped, the detected direction is the same as the vertically downward direction DD. The gyroscope sensor 126g is a sensor that detects angular velocity about a rotational axis in any direction, for example, triaxial angular velocity sensor. The control unit 126c uses a signal from the acceleration sensor 126a, a signal from the gyroscope sensor 126g, and a signal from vehicle velocity sensor 122 to determine the roll angle Ar and the yaw angular velocity. For example, the control unit 126c is a data processor including a computer.

The control unit 126c uses the velocity V detected by the vehicle velocity sensor 122 to calculate the acceleration of the vehicle 10. Then, the control unit 126c uses the acceleration to determine the deviation of the detected direction from the actual vertically downward direction DD due to the acceleration of the vehicle 10 (e.g. the deviation of the detected direction toward the front direction DF or back direction DB is determined). In addition, the control unit 126c uses the angular velocity detected by the gyroscope sensor 126g to determine the deviation of the detected direction from the actual vertically downward direction DD due to the angular velocity of the vehicle 10 (e.g. the deviation of the detected direction toward the right direction DR or left direction DL is determined). The control unit 126c uses the determined deviations to modify the detected direction, and thereby determines the vertically downward direction DD. In this manner, the direction sensor 126 can determine the vertically downward direction DD properly under a variety of driving conditions of the vehicle 10. The control unit 126c then determines the vertically upward direction DU opposite to the vertically downward direction DD, and calculates the roll angle Ar between the vertically upward direction DU and the predetermined vehicle body upward direction DVU. In addition, the control unit 126c determines a component of angular velocity about the axis parallel to the vehicle body upward direction DVU from the angular velocity determined by the gyroscope sensor 126g to identify the determined angular velocity as the yaw angular velocity.

The accelerator pedal sensor 145 is attached to the accelerator pedal 45 (FIG. 1(A)) in order to detect an accelerator operation amount. The brake pedal sensor 146 is attached to the brake pedal 46 (FIG. 1(A)) in order to detect a brake operation amount.

Each sensor 122, 123, 124, 145, 146 is configured using a resolver or encoder, for example.

The controller 100 has a main control unit 110, a drive device control unit 300, a lean motor control unit 400, and a steering motor control unit 500. The controller 100 operates with electric power from the battery 120 (FIG. 1(A)). In this embodiment, the control units 110, 300, 400, 500 each has a computer. More specifically, the control units 110, 300, 400, 500 have processors 110p, 300p, 400p, 500p (e.g. CPU), volatile memories 110v, 300v, 400v, 500v (e.g. DRAM), and non-volatile memories 110n, 300n, 400n, 500n (e.g. flash memory), respectively. The non-volatile memories 110n, 300n, 400n, 500n store in advance programs 110g, 300g, 400g, 500g for operating the corresponding control units 110, 300, 400, 500, respectively. In addition, the non-volatile memory 110n of the main control unit 110 stores in advance map data MAr, MCw. The processors 110p, 300p, 400p, 500p perform a variety of processes by executing the corresponding programs 110g, 300g, 400g, 500g, respectively.

The processor 110p of the main control unit 110 receives signals from the sensors 122, 123, 124, 126, 145, 146. The processor 110p then uses the received signals to output instructions to the drive device control unit 300, the lean motor control unit 400, and the steering motor control unit 500.

The processor 300p of the drive device control unit 300 controls the drive motors 51L, 51R according to the instruction from the main control unit 110. The processor 400p of the lean motor control unit 400 controls the lean motor 25 according to the instruction from the main control unit 110. The processor 500p of the steering motor control unit 500 controls the steering motor 65 according to the instruction from the main control unit 110. These control units 300, 400, 500 respectively have electric power control modules 300c, 400c, 500c which supply the motors 51L, 51R, 25, 65 under control with electric power from the battery 120. The electric power control modules 300c, 400c, 500c are configured using an electric circuit (e.g. inverter circuit). It should be noted that a portion of the main control unit 110 which performs processing for controlling the steering motor 65, and the steering motor control unit 500 as a whole is an example force controller configured to control the force generator 65 (sometimes referred to as force controller 910).

Figure 8:
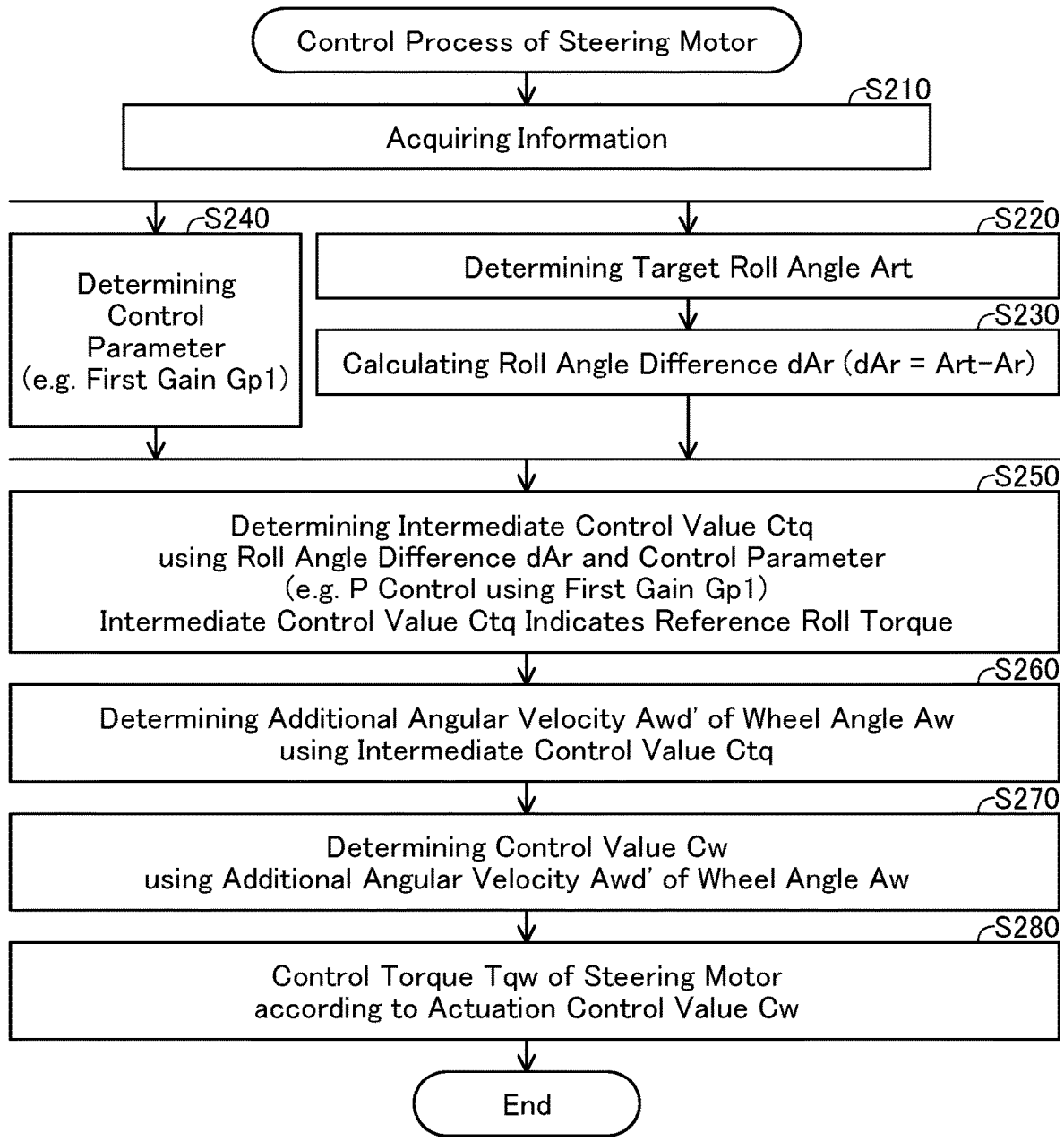
FIG. 8 is a flowchart showing an example control process of a steering motor 65.

A2. Control of Steering Motor:

FIG. 8 is a flowchart showing an example control process of the steering motor 65. In this embodiment, the steering motor 65 is controlled so that a change in the wheel angle Aw results in a roll torque which makes the roll angle Ar close to a target roll angle. In flowcharts, each step is labeled with a reference of an alphabet "S" followed by a numeral. FIG. 8 illustrates the process when the vehicle 10 is moving forward. As described later, a variety of parameters are used in the control process. It should be noted that the mass M of the vehicle body 90, the acceleration of gravity g, the distance X, the distance Z, and the wheelbase Lh can each be measured experimentally. In this embodiment, predetermined values (sometimes referred to as reference values M, g, X, Z, Lh) are used as the respective parameters M, g, X, Z, Lh. It should be noted that the mass M of the vehicle body 90 corresponds to a so-called sprung mass.

In S210, the processor 110p of the main control unit 110 (FIG. 7) acquires data from the sensors 122, 123, 124, 126, 145, 146. The processor 110p then determines current information, in particular, the velocity V, input angle AI, wheel angle Aw, roll angle Ar, yaw angular velocity Ay', accelerator operation amount Pa, brake operation amount Pb.

In S220, the processor 110p uses the input angle AI to determine a target roll angle Art. A correspondence relationship between the input angle AI and the target roll angle Art is predetermined by map data MAr (FIG. 7). The processor 110p references the map data MAr to identify the target roll angle Art. In this embodiment, the larger the absolute value of the input angle AI is, the larger the absolute value of the target roll angle Art is. The direction (right or left) of the target roll angle Art is the same as the turning direction determined by the input angle AI. In S230, the processor 110p calculates a roll angle difference dAr by subtracting the current roll angle Ar from the target roll angle Art.

In S240, the processor 110p determines a control parameter. In this embodiment, the processor 110p determines a P gain Gp1 for proportional control (sometimes referred to as first gain Gp1). It should be noted that the processor 110p performs S220-S230 and S240 in parallel. In S250, the processor 110p then determines an intermediate control value Ctq through the proportional control using the roll angle difference dAr and the first gain Gp1 (e.g. Ctq=Gp1*dAr).

As described later, the intermediate control value Ctq indicates a reference roll torque. The zero intermediate control value Ctq indicates a roll torque of zero. The positive intermediate control value Ctq indicates a roll torque in the right direction DR. The negative intermediate control value Ctq indicates a roll torque in the left direction DL. The larger the absolute value of the intermediate control value Ctq is, the larger the absolute value of the roll torque is. The steering motor 65 is controlled so that the first type roll torque generated due to the angular velocity Aw' of the wheel angle Aw is made close to the reference roll torque. It should be noted that the larger the magnitude of the roll angle difference dAr is, the larger the magnitude of the intermediate control value Ctq (i.e. the reference roll torque) is. In addition, the larger the first gain Gp1 is, the larger the magnitude of the reference roll torque is.

Figure 9:
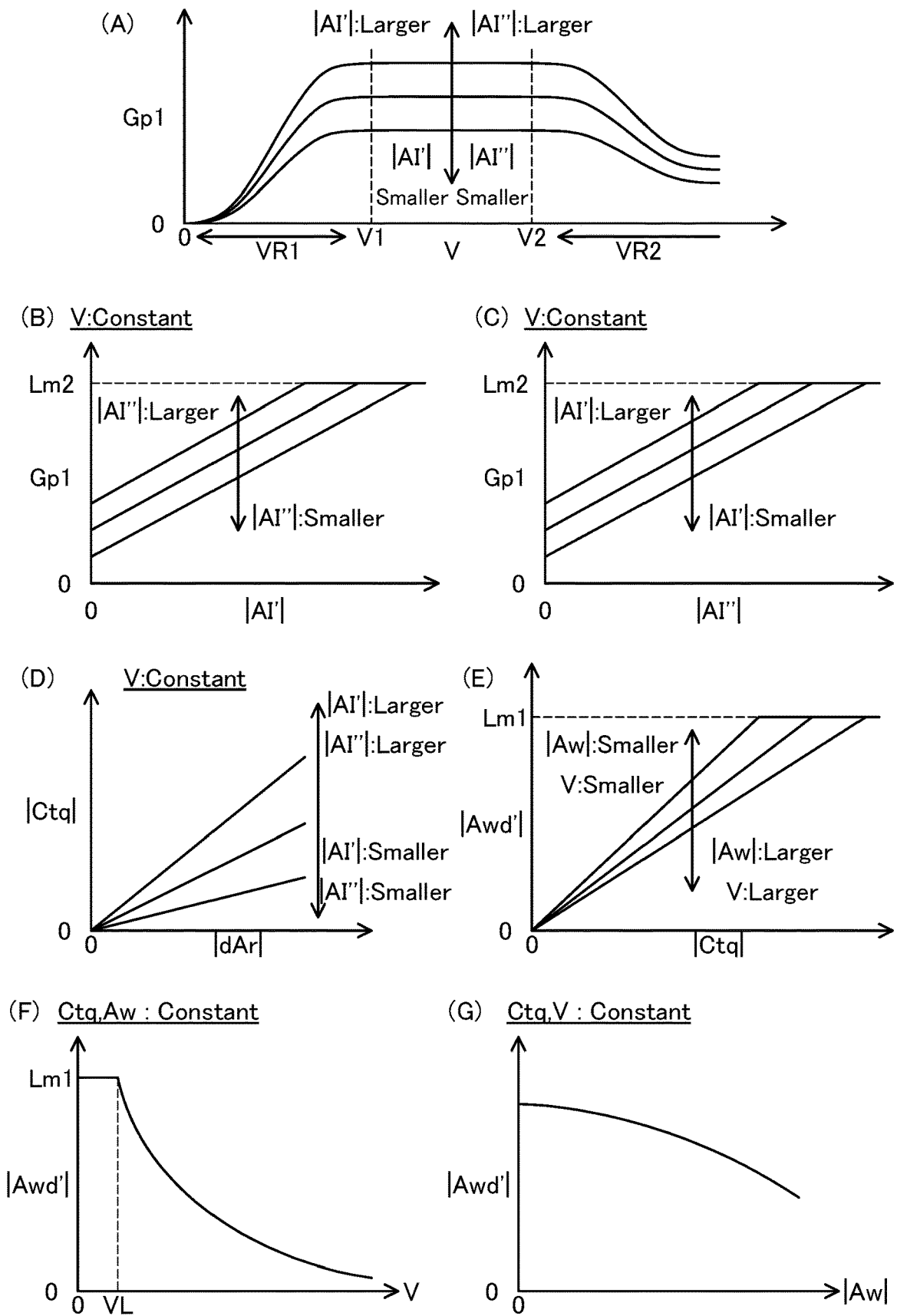
FIGS. 9(A)-(C) are graphs showing examples of a first gain Gp1.
FIG. 9(D) is a graph showing an example relationship between a roll angle difference dAr and an intermediate control value Ctq; FIGS. (E)-(G) are graphs showing examples of an additional angular velocity Awd'.

FIG. 9(A)-FIG. 9(C) are graphs showing examples of the first gain Gp1. In FIG. 9(A), the horizontal axis represents the velocity V, and the vertical axis represents the first gain Gp1. When the velocity V is within a first range VR1 between zero and a first threshold V1, inclusive, the smaller the velocity V is, the smaller the first gain Gp1 is (e.g. the first threshold V1 is a value within a range between 1 km/hour and 5 km/hour, inclusive). And, if V=0, Gp=0 (i.e. Ctq=0). The reason is as follows. As described later, in this embodiment, the steering motor 65 is controlled so that the angular velocity Aw' of the wheel angle Aw is made close to the value calculated according to Equation A8 described above. As indicated in Equation A8, the absolute value of the angular velocity Aw' of the wheel angle Aw is inversely proportional to the velocity V. If the angular velocity Aw' strictly follows Equation A8, the absolute value of the angular velocity Aw' diverges as the velocity V approaches zero. In this embodiment, in order to prevent the parameter from diverging when the velocity V is smaller, the first gain Gp1 is smaller when the velocity V is smaller. This results in the smaller intermediate control value Ctq (i.e. reference roll torque), and therefore the divergence of the angular velocity Aw' is suppressed.

When the velocity V is within a second range VR2 of not smaller than a second threshold V2, the larger the velocity V is, the smaller the first gain Gp1 is (e.g. the second threshold V2 is a value within a range between 30 km/hour and 40 km/hour, inclusive). The reason is as follows. When a rotating object is subject to an external torque about an axis perpendicular to a rotational axis, a torque about an axis perpendicular to the rotational axis and to an axis of the external torque acts on the object (sometimes referred to as gyroscopic moment). The object then rotates due to the gyroscopic moment. Such a movement is also referred to as precession movement. For example, when the vehicle body 90 leans to the right direction DR while the vehicle 10 (FIG. 1(A)) is traveling forward, the front wheel 12F rotating about the rotational axis Axw1 also leans to the right direction DR along with the vehicle body 90. In this manner, the front wheel 12F is subject to a torque about an axis perpendicular to the rotational axis Axw1 and parallel to the front direction DF. In this case, the front wheel 12F (FIG. 1(B)) is subject to a torque that turns the traveling direction D12 about the turning axis Ax1 to the right direction DR. The front wheel 12F turns to the right direction DR. The torque which turns the front wheel 12F increases with an increase in the angular momentum of the front wheel 12F, i.e. an increase in the velocity V. In this manner, when the velocity V is larger, the front wheel 12F can spontaneously turn to the lean direction of the vehicle body 90. In this embodiment, when the velocity V is larger, the first gain Gp1 is smaller in order to allow for the spontaneous turn of the front wheel 12F. As described later, when the first gain Gp1 is smaller, the magnitude of the intermediate control value Ctq (i.e. reference roll torque) is smaller, and therefore the magnitude of the turning torque of the steering motor 65 is also smaller. Thereby, the spontaneous turn of the front wheel 12F is allowed.

It should be noted that when the velocity V is constant, the first gain Gp1 can change depending on the angular velocity AI' and angular acceleration AI" of the input angle AI. FIG. 9(B) is a graph when the velocity V is constant, where the horizontal axis represents the absolute value of the angular velocity AI' of the input angle AI, and the vertical axis represents the first gain Gp1. As shown, the larger the absolute value of the angular velocity AI' is, the larger the first gain Gp1 is. FIG. 9(C) is a graph when the velocity V is constant, where the horizontal axis represents the absolute value of the angular acceleration AI" of the input angle AI, and the vertical axis represents the first gain Gp1. As shown, the larger the absolute value of the angular acceleration AI" is, the larger the first gain Gp1 is. The reason is as follows. The driver turns the steering wheel 41a quickly in order to change quickly the traveling direction of the vehicle 10. Accordingly, the roll angle Ar is required to change quickly when the absolute value of the angular velocity AI' is larger or when the absolute value of the angular acceleration AI" is larger. Therefore, in this embodiment, in order to make the absolute value of the intermediate control value Ctq (i.e. reference roll torque) larger, the larger the absolute value of the angular velocity AI' is, the larger the first gain Gp1 is, and the larger the absolute value of the angular acceleration AI" is, the larger the first gain Gp1 is. It should be noted that in order to suppress any excess increase in the intermediate control value Ctq, the processor 110p sets a second upper limit Lm2 to the first gain Gp1.

It should be noted that the correspondence between the first gain Gp1 and the other parameters may be any of a variety of other correspondences instead of the correspondences shown in FIG. 9(A)-FIG. 9(C). For example, in the second range VR2 (FIG. 9(A)), when the velocity V increases, the first gain Gp1 may remain without any reduction, or may increase. In addition, the range of the velocity V of not smaller than the first threshold V1 may be divided into three ranges of low velocity range, medium velocity range, and high velocity range. And, the first gain Gp1 of the low velocity range and the first gain Gp1 of the high velocity range may be set to a larger value as compared to the first gain Gp1 of the medium velocity range. The larger first gain Gp1 of the low velocity range can assist in the front wheel 12F turning to the turning direction when the gyroscopic moment is smaller. On the other hand, when the velocity V is larger, the rotational rate of the front wheel 12F is larger, and thus the angular momentum of the front wheel 12F is also larger. In this case, a larger torque may be required to turn the front wheel 12F to the turning direction. The larger first gain Gp1 of the high velocity range can assist in the front wheel 12F turning to the turning direction.

FIG. 9(D) is a graph showing an example relationship between the roll angle difference dAr and the intermediate control value Ctq. The horizontal axis represents the absolute value of the roll angle difference dAr, and the vertical axis represents the absolute value of the intermediate control value Ctq. This graph shows the case where the velocity V is constant. As shown, the larger the absolute value of the roll angle difference dAr is, the larger the absolute value of the intermediate control value Ctq is. When the absolute value of the roll angle difference dAr is constant, the larger the absolute value of the angular velocity AI' of the input angle AI is, the larger the absolute value of the intermediate control value Ctq is. In addition, the larger the absolute value of the angular acceleration AI" of the input angle AI is, the larger the absolute value of the intermediate control value Ctq is.

In S260 (FIG. 8), the processor 110p uses the intermediate control value Ctq to determine the angular velocity of the wheel angle Aw (sometimes referred to as additional angular velocity Awd') The additional angular velocity Awd' represents an angular velocity such that the additional angular velocity Awd' is added to the current angular velocity Aw' of the wheel angle Aw to generate the reference roll torque mapped to the intermediate control value Ctq. Such a relationship between the additional angular velocity Awd' and the intermediate control value Ctq is expressed by Equation A8 describe above. In Equation A8, the intermediate control value Ctq is used instead of the first type roll torque Tqa, and the angular velocity Aw' represents the additional angular velocity Awd'. The processor 110p uses the reference values Lh, M, X, Z, the intermediate control value Ctq, the wheel angle Aw, and the velocity V to calculate the additional angular velocity Awd'.

FIG. 9(E)-FIG. 9(G) are graphs showing examples of the additional angular velocity Awd'. In FIG. 9(E), the horizontal axis represents the absolute value of the intermediate control value Ctq, and the vertical axis represents the absolute value of the additional angular velocity Awd'. As shown, the larger the absolute value of Ctq is, the larger the absolute value of Awd' is. When the intermediate control value Ctq is constant, the additional angular velocity Awd' can change depending on the velocity V and the wheel angle Aw. It should be noted that in this embodiment, the processor 110p sets a first upper limit Lm1 to the absolute value of Awd'. In FIG. 9(F), the horizontal axis represents the velocity V, and the vertical axis represents the absolute value of the additional angular velocity Awd'. The larger the velocity V is, the smaller the absolute value of Awd' is. In this embodiment, the absolute value of Awd' is inversely proportional to V, as also indicated in Equation A8 described above. In order to prevent the additional angular velocity Awd' from diverging when the velocity V is smaller, the absolute value of Awd' is limited to the first upper limit Lm1. In FIG. 9(G), the horizontal axis represents the absolute value of the wheel angle Aw, and the vertical axis represents the absolute value of the additional angular velocity Awd'. The larger the absolute value of the wheel angle Aw is, the smaller the absolute value of Awd' is. In this embodiment, as the absolute value of Aw increases, the absolute value of Awd' decreases according to $\cos^2(Aw)$, as also indicated in Equation A8 described above.

In S270 (FIG. 8), the processor 110p uses the additional angular velocity Awd' to determine an actuation control value Cw (sometimes simply referred to as control value Cw). The control value Cw indicates a turning torque to be generated by the steering motor 65. In this embodiment, the control value Cw indicates direction and magnitude of electric current to be supplied to the steering motor 65. The absolute value of the control value Cw indicates the magnitude of the electric current (i.e. the magnitude of the turning torque). The positive/negative signs of the control value Cw indicates the direction of the electric current (i.e. the direction of the turning torque) (e.g. the positive sign indicates the right direction while the negative sign indicates the left direction). A correspondence relationship between the additional angular velocity Awd' and the control value Cw is predetermined by map data MCw (FIG. 7). The larger the absolute value of the additional angular velocity Awd' is, the larger the absolute value of the control value Cw is. In addition, the positive/negative sign of the control value Cw (i.e. the direction of the turning torque) is the same as the direction of the additional angular velocity Awd'. The processor 110p references the map data MCw to identify the actuation control value Cw mapped to the additional angular velocity Awd'.

In S280, the processor 110p provides data indicative of the actuation control value Cw to the steering motor control unit 500. The processor 500p of the steering motor control unit 500 controls the electric power to be supplied to the steering motor 65 according to the actuation control value Cw. Specifically, the processor 500p provides the data indicative of the actuation control value Cw to the electric power control module 500c. The electric power control module 500c controls the electric power to be supplied to the steering motor 65 according to the actuation control value Cw. The steering motor 65 outputs the turning torque according to the supplied electric power. Then, the process of FIG. 8 ends. The controller 100 repeatedly performs the process of FIG. 8. As such, the controller 100 continuously controls the steering motor 65 to output the turning torque appropriate for the state of the vehicle 10.

As discussed above, the actuation control value Cw indicates the turning torque mapped to the additional angular velocity Awd' (S270). A parameter Tqa mapped to the additional angular velocity Awd' according to Equation A8 indicates the first type roll torque Tqa to be generated due to the additional angular velocity Awd'. In S260, the intermediate control value Ctq is used as the parameter Tqa indicative of the first type roll torque to calculate the additional angular velocity Awd' according to Equation A8. Therefore, the intermediate control value Ctq indicates the first type roll torque. In S250, the intermediate control value Ctq is determined through the proportional control using the roll angle difference dAr and the control parameter (in this case, P gain Gp1). In this embodiment, the magnitude of the intermediate control value Ctq (i.e. the magnitude of the first type roll torque) is increased with an increase in the magnitude of the roll angle difference dAr. In addition, the positive/negative sign of the intermediate control value Ctq (i.e. the direction of the first type roll torque) is the same as the positive/negative sign of the roll angle difference dAr (i.e. roll direction from the roll angle Ar to the target roll angle Art) (hereinafter, the roll direction from the roll angle Ar to the target roll angle Art may be referred to as 'direction of roll angle difference dAr'). In this manner the roll angle difference dAr indicates the reference roll torque which is a reference of the first type roll torque to be generated due to the additional angular velocity Awd'. The magnitude of the roll angle difference dAr indicates a reference magnitude which is the magnitude of the reference roll torque. The positive/negative sign of the roll angle difference dAr indicates a reference direction which is the direction of the reference roll torque. The roll angle difference dAr is an example of reference information which indicates the reference direction as a reference of direction and the reference magnitude as a reference of magnitude for the first type roll torque to act on the vehicle body 90 (hereinafter, the roll angle difference dAr may be referred to as reference information dAr). The controller 100 controls the steering motor 65 according to the actuation control value Cw to be determined using the reference information dAr. As such, the steering motor 65 generates the turning torque so that the direction of the first type roll torque is the same as the reference direction, and the magnitude of the first type roll torque increases with an increase in the reference magnitude. If the steering motor 65 is controlled according to the actuation control value Cw, the roll angle Ar approaches the target roll angle Art, and therefore the vehicle 10 can travel at the roll angle Ar appropriate for the input angle AI (i.e. with the target roll angle Art).

Figure 10:
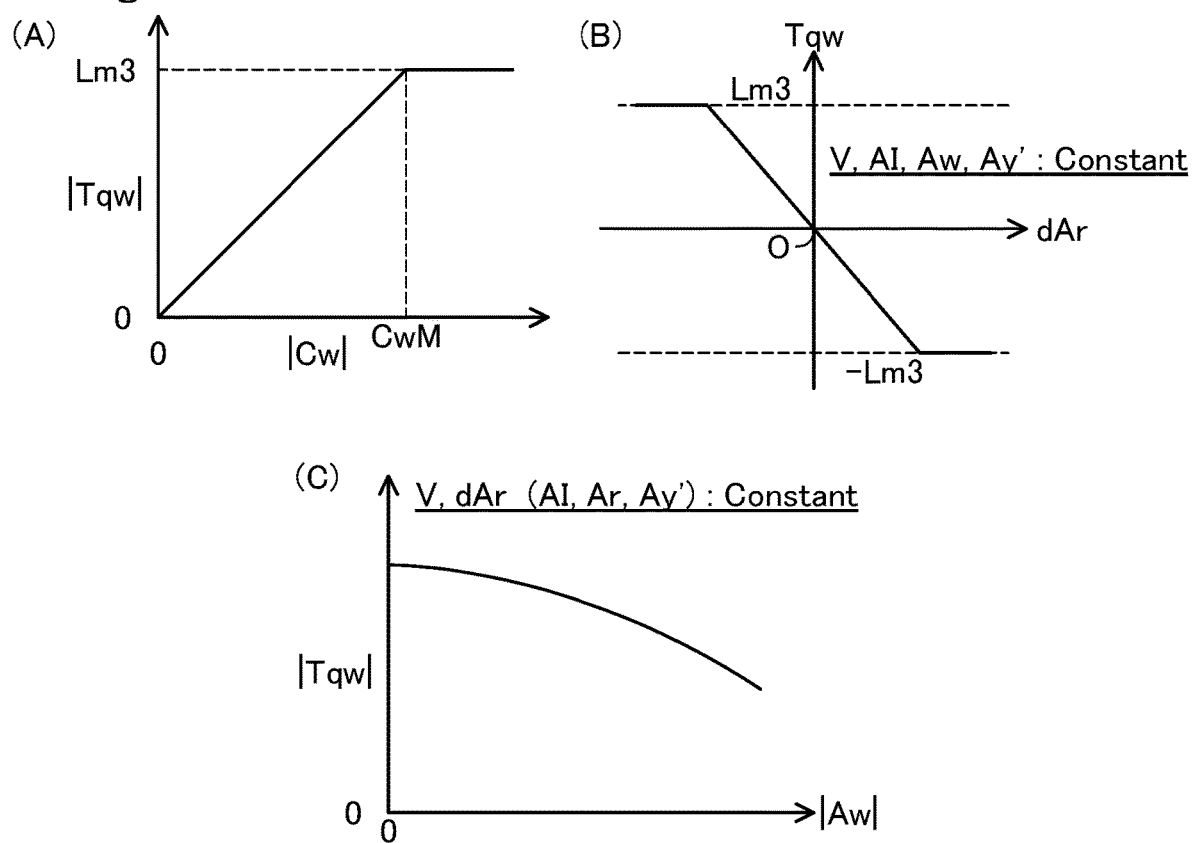
FIGS. 10(A)-(C) are graphs showing examples of turning torque Tqw.

FIG. 10(A)-FIG. 10(C) are graphs showing examples of the turning torque Tqw controlled in the process of FIG. 8. In FIG. 10(A), the horizontal axis represents the absolute value of the actuation control value Cw, and the vertical axis represents the absolute value of the turning torque Tqw. The absolute value of the turning torque Tqw increases with an increase in the absolute value of the actuation control value Cw. It should be noted that in this embodiment, the processor 110p modifies the absolute value of the actuation control value Cw to the upper limit CwM in S280 of FIG. 8 if the absolute value of the actuation control value Cw is equal to or larger than a predetermined upper limit CwM. Accordingly, the absolute value of the turning torque Tqw is limited to an upper limit Lm3 mapped to the upper limit CwM. As a result, the wheel angle Aw is suppressed from changing rapidly.

In FIG. 10(B), the horizontal axis represents the roll angle difference dAr, and the vertical axis represents the turning torque Tqw. At the origin O, dAr=0, and Tqw=0. In this figure, assume that the velocity V, input angle AI, wheel angle Aw, and yaw angular velocity Ay' each are constant. Such a condition can be reproduced by placing the vehicle 10 on a turntable which can rotate the vehicle 10 about an axis parallel to the vertically upward direction DU. An angular velocity of rotation of the turntable represents a yaw angular velocity about the axis parallel to the vertically upward direction DU. The yaw angular velocity Ay' about the axis parallel to the vehicle body upward direction DVU can be determined using data from the direction sensor 126. The magnitude of the yaw angular velocity Ay' increases with an increase in the angular velocity of rotation of the turntable. The turntable has a plurality of rollers which rotates the respective wheels 12F, 12R, 12L at the rotational rate according to the velocity V. In order to maintain the wheel angle Aw constant, the front fork 17 is fixed to the vehicle body 90. The turning torque Tqw can be determined using the electric current to be supplied to the steering motor 65.

The absolute value of the intermediate control value Ctq to be determined in S250 (FIG. 8) increases with an increase in the absolute value of the roll angle difference dAr. Accordingly, the larger the absolute value of the roll angle difference dAr is, the larger the absolute value of the turning torque Tqw is also (however, the absolute value of the turning torque Tqw is limited to the upper limit Lm3).

In addition, the roll angle difference dAr being a positive value indicates that a reference roll direction from the roll angle Ar to the target roll angle Art is rightward. As can be understood from FIG. 6(B), FIG. 6(C), when turning the direction D12 of the front wheel 12F to the right direction DR, the direction of the first type roll torque Tqa is the left direction DL. Accordingly, in order to generate the first type roll torque Tqa of the right direction DR, a negative turning torque Tqw is generated that turns the direction D12 of the front wheel 12F to the left direction DL. In contrast, when the roll angle difference dAr is a negative value, a positive turning torque Tqw is generated.

In FIG. 10(C), the horizontal axis represents the absolute value of the wheel angle Aw, and the vertical axis represents the absolute value of the turning torque Tqw. This graph illustrates characteristics under the condition (referred to as first condition) that each of the velocity V and the reference information dAr (i.e. the reference direction and reference magnitude) is maintained constant (the absolute value of dAr is larger than zero). In order to identify the relationship between the wheel angle Aw and the turning torque Tqw, assume that the other parameters (e.g. AI, Ar, Ay') are constant. The wheel angle Aw is variable. In order to realize such a condition, the vehicle 10 is placed on the above-mentioned turntable. The roller for supporting the front wheel 12F is configured to respond to any turn of the front wheel 12F to turn to the same direction. When the steering motor 65 generates the turning torque, the roller for supporting the front wheel 12F turns along with the front wheel 12F to the direction of the turning torque.

As shown, even if the reference information dAr is constant, the absolute value of the turning torque Tqw decreases as the absolute value of the wheel angle Aw increases. This reason is that the angular velocity Aw' of the wheel angle Aw (i.e. the turning torque Tqw) decreases according to $\cos^2(Aw)$ as indicated in Equation A8 described above. In this manner, because the turning torque Tqw is controlled according to Equation A8, the controller 100 can make the first type roll torque due to the angular velocity Aw' close to the reference torque.

As discussed above, the controller 100 performs the process of FIG. 8 to control the steering motor 65 so that the roll angle Ar approaches the target roll angle Art. As a result, the vehicle 10 can travel at the roll angle Ar appropriate for the input angle AI. For example, when the magnitude of the roll angle difference dAr is larger, and the roll direction from the current roll angle Ar to the target roll angle Art is rightward (i.e. the direction of the roll angle difference dAr is rightward), the steering motor 65 turns the front wheel 12F to the left direction, which is opposite to the direction of the roll angle difference dAr. As such, the roll angle Ar quickly approaches the target roll angle Art. The steering motor 65 then outputs the turning torque through the similar control so that the roll angle Ar is maintained at the roll angle difference dAr. As such, the wheel angle Aw can approach an angle appropriate for the roll angle Ar (FIG. 4, FIG. 5). When the magnitude of the roll angle difference dAr is smaller, the magnitude of the turning torque is also smaller. As discussed above, due to the gyroscopic moment, the front wheel 12F can spontaneously turn to the roll direction of the vehicle body 90. Accordingly, the vehicle 10 can make a turn appropriate for the input angle AI. For example, the vehicle 10 can make the turn as shown in FIG. 4, FIG. 5.

In addition, as described with reference to FIG. 6(B), FIG. 6(C), the first type roll torque Tqa obtained using the angular velocity Aw' of the wheel angle Aw is generated using the inertial force F12 in the direction opposite to that of the yaw angular acceleration Ay". Accordingly, as compared to when the vehicle body 90 rolls due to the roll torque generated directly by the lean motor 25, the lateral acceleration which the driver feels is suppressed when vehicle body 90 rolls due to the first type roll torque Tqa.

Figure 11:
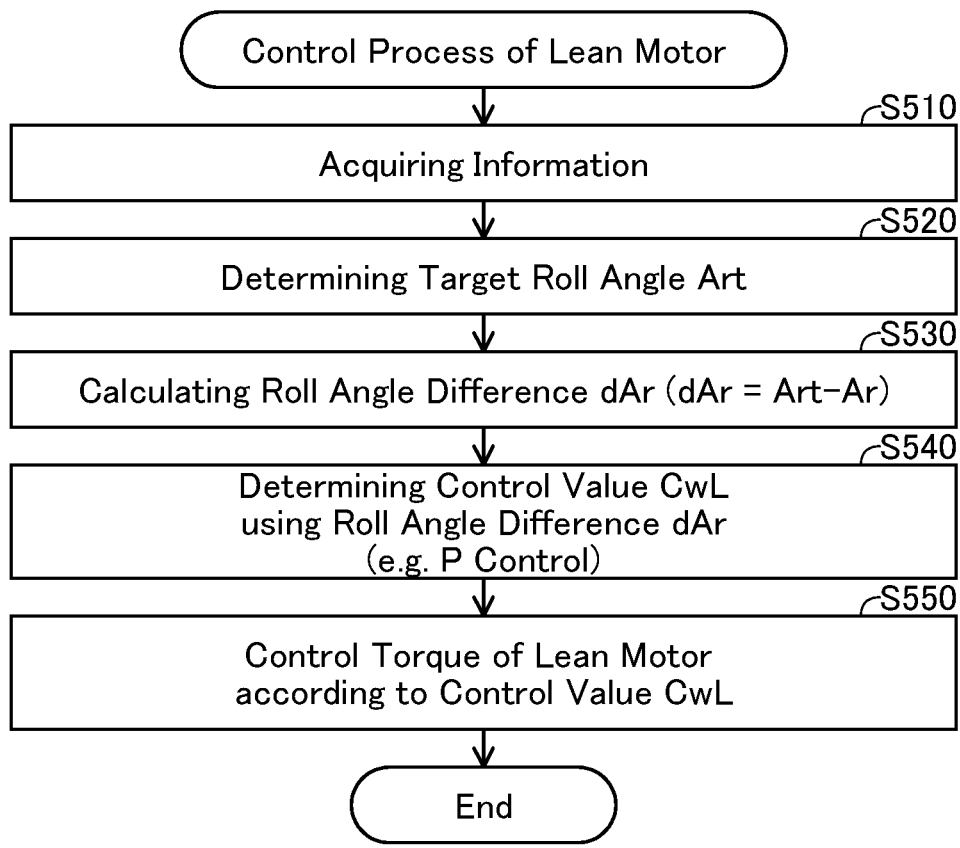
FIG. 11 is a flowchart showing an example control process of a lean motor 25.

A3. Control of Lean Motor:

FIG. 11 is a flowchart showing an example control process of the lean motor 25. In this embodiment, the lean motor 25 is controlled to generate a roll torque which makes the roll angle Ar close to a target roll angle. In S510, the processor 110p of the main control unit 110 (FIG. 7) acquires signals from the sensors 123, 126. The processor 110p then determines current information, in particular, the input angle AI, roll angle Ar.

S520, S530 is the same as S220, S230 in FIG. 8, respectively. In S540, the processor 110p uses the roll angle difference dAr to determine a control value CwL. In this embodiment, the processor 110p then determines the control value CwL through a proportional control using the roll angle difference dAr. In S550, the processor 110p provides data indicative of the control value CwL to the lean motor control unit 400. The processor 400p of the lean motor control unit 400 controls the electric power to be supplied to the lean motor 25 according to the control value CwL. Specifically, the processor 400p provides the data indicative of the control value CwL to the electric power control module 400c. The electric power control module 400c controls the electric power to be supplied to the lean motor 25 according to the control value CwL. The lean motor 25 outputs the roll torque according to the supplied electric power. Then, the process of FIG. 11 ends. The controller 100 repeatedly performs the process of FIG. 11. As such, the controller 100 continuously controls the lean motor 25 to output the roll torque appropriate for the state of the vehicle 10.

As discussed above, the controller 100 controls each of the lean motor 25 and the steering motor 65 to generate the roll torque which makes the roll angle Ar close to the target roll angle Art. As a result, the vehicle 10 can travel at the roll angle Ar appropriate for the input angle AI. Then, the vehicle 10 can make a turn appropriate for the input angle AI.

It should be noted that the main control unit 110 (FIG. 7) and the drive device control unit 300 serve as a drive controller 900 for controlling the drive motors 51R, 51L. The drive controller 900 controls the drive motors 51R, 51L to achieve an acceleration appropriate for the accelerator operation amount Pa and a deceleration appropriate for the brake operation amount Pb.

B. Second Embodiment

Figure 12:
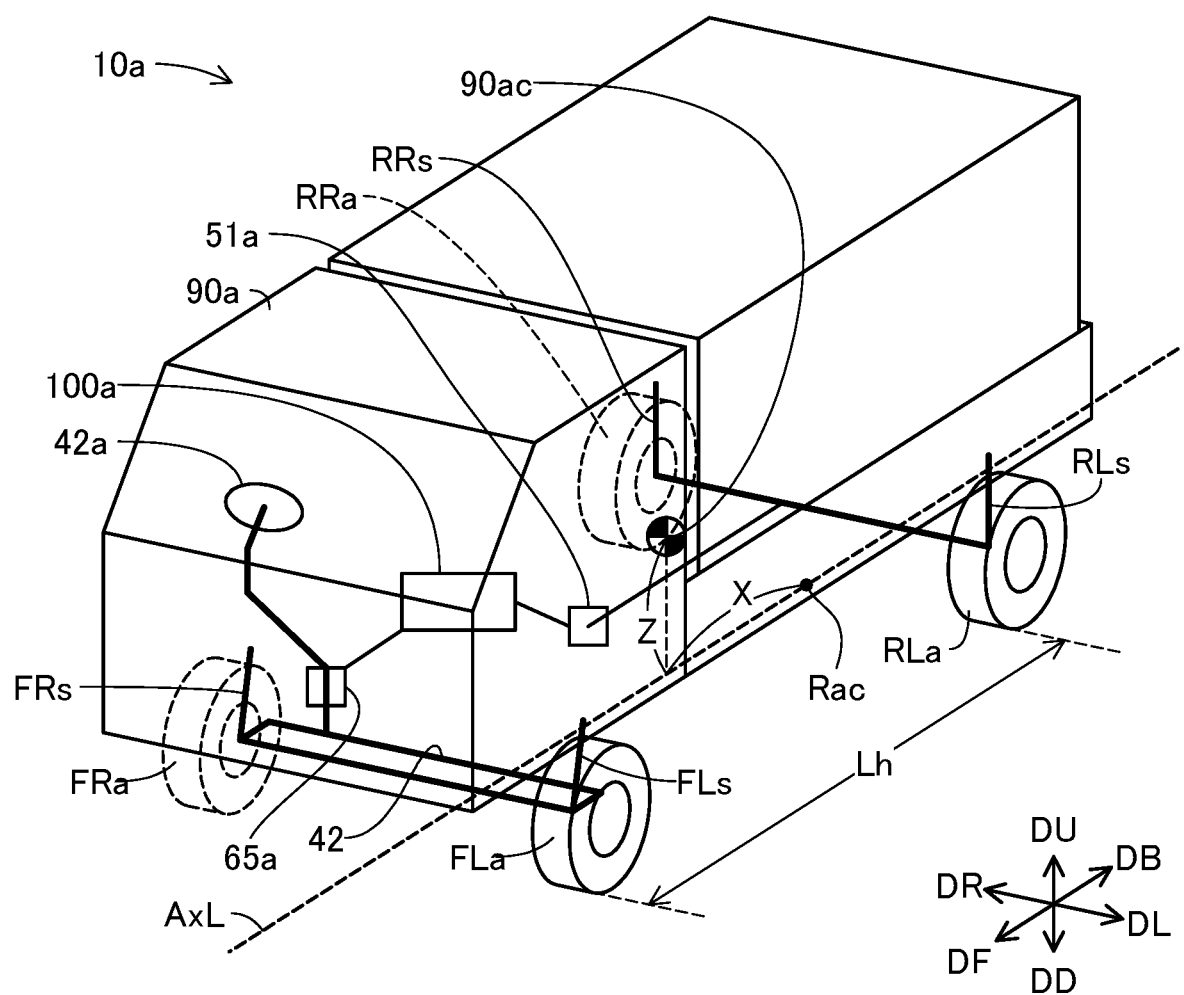
FIG. 12 shows a perspective view of a vehicle in a second embodiment.

FIG. 12 shows a perspective view of a vehicle in a second embodiment. In this embodiment, the vehicle 10a is a four-wheel vehicle having two front wheels FRa, FLa and two rear wheels RRa, RLa. The two front wheels FRa, RLa are turn wheels, and can turn in the width direction of the vehicle 10a. The two rear wheels RRa, RLa are drive wheels. The vehicle 10a further has a vehicle body 90a, suspensions FRs, FLs, RRs, RLs, a steering device 42, a steering wheel 42a, a drive motor 51, and a controller 100a. The wheels FRa, FLa, RRa, RLa are coupled to the vehicle body 90a by the suspensions FRs, FLs, RRs, RLs, respectively. The suspensions FRs, FLs, RRs, RLs may be a variety of suspensions such as double wishbone suspension, torsion beam suspension. A drive motor 51a is connected to the rear wheels RRa, RLa. The rear wheels RRa, RLa are powered by the drive motor 51a to rotate. The steering device 42 is connected to the front wheels FRa, FLa. The steering device 42 may be configured in a variety of ways such as rack-and-pinion type. The steering wheel 42a is connected to the steering device 42. The driver can turn the traveling direction of the front wheels FRa, FLa to right or left by rotating the steering wheel 42a. The steering device 42 has a steering motor 65a. The steering motor 65a generates a torque which assists in steering. The controller 100a controls the steering motor 65a and the drive motor 51a. A distance Lh is a so-called wheelbase. Again in this embodiment, the roll axis AxL is located on the ground GL at the center of the vehicle body 90a in its width direction. Because the front wheels FRa, FLa are turn wheels, and the rear wheels RRa, RLa are not turn wheels, a rotation center Rac is located in the proximity of the center between the rear wheels RRa, RLa. The gravity center 90ac of the vehicle body 90a is located on the front direction DF side of the rotation center Rac. A distance X is a distance in the front direction DF between the rotation center Rac and the gravity center 90ac of the vehicle body 90a. A distance is a distance between the roll axis AxL and the gravity center 90ac. The distance Z is the same as a height of the gravity center 90ac from the ground.

The vehicle 10a has as a control related configuration a configuration obtained by modifying that of FIG. 7 as follows.

1) the drive device control unit 300 controls the drive motor 51.
2) The steering motor control unit 500 controls the steering motor 65a instead of the steering motor 65.
3) The lean motor control unit 400 and the lean motor 25 are omitted.

Figure 13:
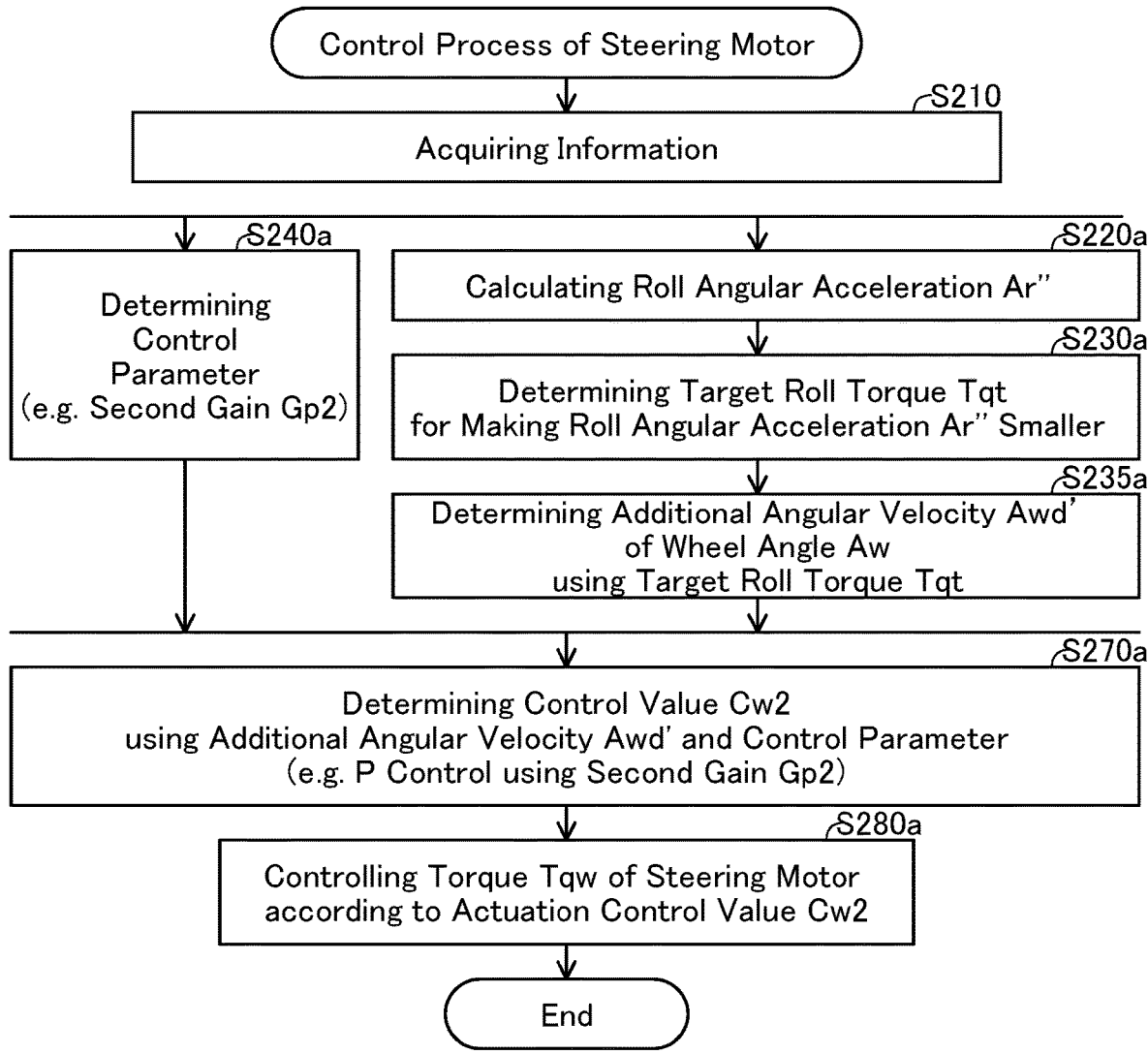

FIG. 13 is a flowchart showing an example control process of the steering motor 65a. In this embodiment, the controller 100a controls the steering motor 65 so that a change in the wheel angle Aw results in a roll torque which makes the angular acceleration Ar" (referred to as roll angular acceleration Ar") of the roll angle Ar smaller. Again in this embodiment, predetermined values are used as the mass M of the vehicle body 90a, the acceleration of gravity g, the distance X, the distance Z, and the wheelbase Lh. The wheel angle Aw is an angle of direction of the front wheel (e.g. Right front wheel FRa or left front wheel FLa) relative to the front direction DF of the vehicle 10a.

In S210, the processor 110p of the main control unit 110 (FIG. 7) acquires data from the sensors 122, 123, 124, 126, 145, 146. The processor 110p then determines current information, in particular, the velocity V, input angle AI, wheel angle Aw, roll angle Ar, yaw angular velocity Ay', accelerator operation amount Pa, brake operation amount Pb.

In S220a, the processor 110p calculates the angular acceleration Ar" of the roll angle Ar. Initially, the processor 110p uses the roll angle Ar to calculate the angular velocity Ar'. The method of calculating the angular velocity Ar' (more specifically, the method of calculating derivative values of parameters) may include a variety of methods. In this embodiment, the processor 110p calculates a difference between the current roll angle Ar and the roll angle Ar at a point of time in the past by a predetermined time difference from current time by subtracting the latter from the former. The processor 110p then employs as the angular velocity Ar' a value obtained by dividing the difference by the time difference. The processor 110p uses the angular velocity Ar' to calculate the angular acceleration Ar" in the same manner, which is a derivative value of the angular velocity Ar'.

In S230a, the processor 110p determines a target roll torque Tqt for making the roll angular acceleration Ar" smaller. Equation B1 below is a formula of the roll torque Tqr which acts on the vehicle body 90a when the roll angular acceleration is Ar".

$$Tqr=(I+M*Z^2)*Ar''$$ (Equation B1)

The roll torque Tqr is approximated by two components [$I*Ar''$] and [$M*Z^2*Ar''$]. The variable I is an inertia moment of the vehicle body 90 when the rotational axis passes through the gravity center 90c (where the rotational axis is parallel to the roll axis AxL). [$M*Z^2$] is an additional term when the rotational axis away from the gravity center 90c by the distance Z. The coefficient [$I+M*Z^2$] is determined in advance by experimentally measuring a ratio of the roll torque Tqr to the roll angular acceleration Ar". The processor 110p uses Equation B1 described above to calculate the roll torque Tqr which acts on the vehicle body 90a when the roll angular acceleration of the vehicle body 90a is Ar". The processor 110p then employs as the target roll torque Tqt a roll torque obtained by inverting the direction of the roll torque Tqr.

Figure 14:
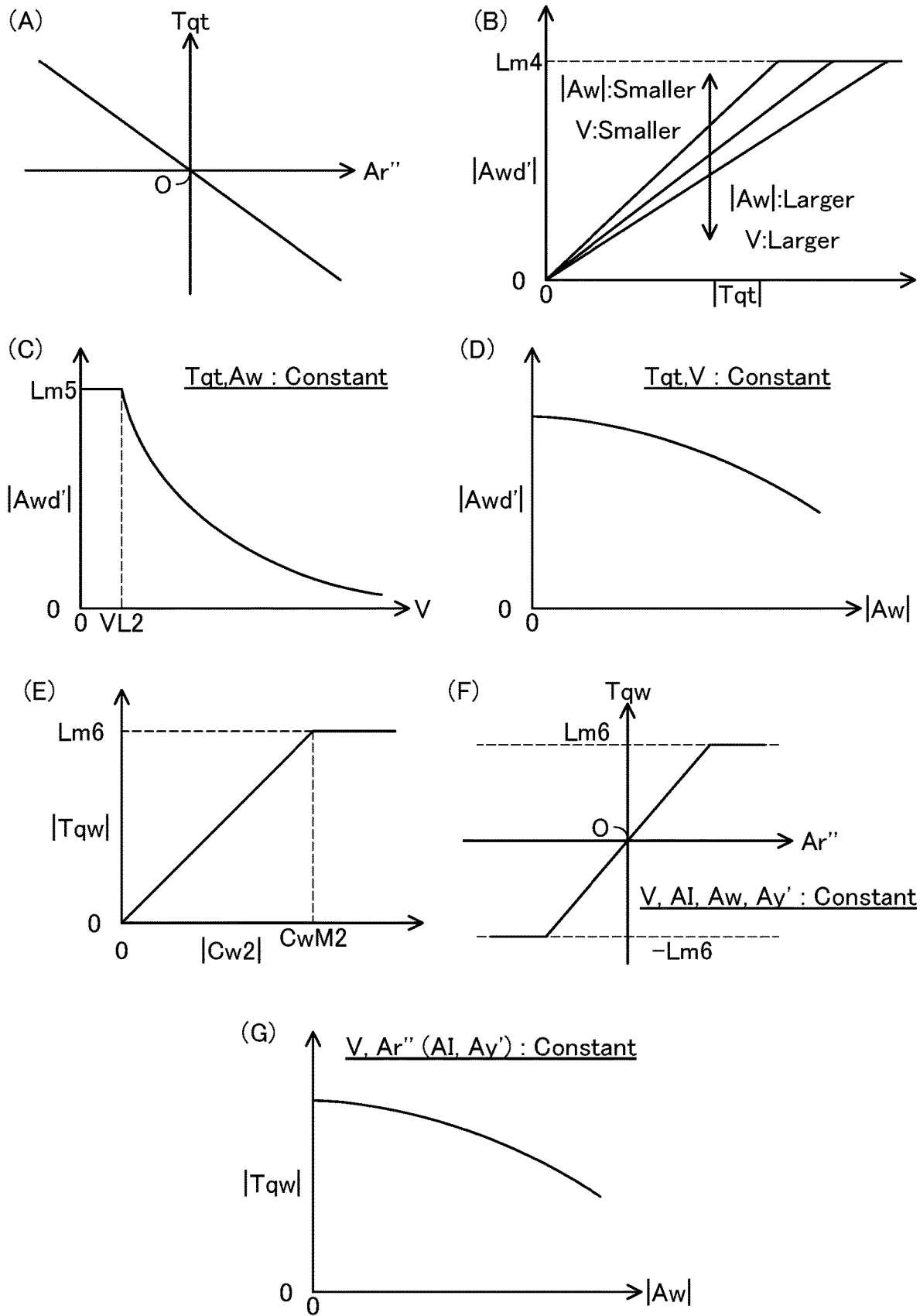
FIG. 14(A) is a graph showing an example relationship between the roll angular acceleration Ar" and the target roll torque Tqt.
FIGS. 14(B)-(D) are graphs showing examples of additional angular velocity Awd'.
FIGS. 14(E)-(G) are graphs showing examples of turning torque Tqw.

FIG. 14(A) is a graph showing an example relationship between the roll angular acceleration Ar" and the target roll torque Tqt. The horizontal axis represents the roll angular acceleration Ar", and the vertical axis represents the target roll torque Tqt. At the origin O, Ar"=0, and Tqt=0. As shown, the larger the absolute value of the roll angular acceleration Ar" is, the larger the absolute value of the target roll torque Tqt is. The direction (i.e. positive/negative sign) of the target roll torque Tqt is opposite to the direction (i.e. positive/negative sign) of the roll angular acceleration Ar".

In S235a (FIG. 13), the processor 110p determines the angular velocity of the wheel angle Aw (referred to as additional angular velocity Awd') required to generate the target roll torque Tqt. The additional angular velocity Awd' is calculated by substituting the target roll torque Tqt for the first type roll torque Tqa in Equation A8 described above.

FIG. 14(B)-FIG. 14(D) are graphs showing examples of the additional angular velocity Awd'. In FIG. 14(B), the horizontal axis represents the absolute value of the target roll torque Tqt, and the vertical axis represents the absolute value of the additional angular velocity Awd'. As shown, the larger the absolute value of Tqt is, the larger the absolute value of Awd' is. When the target roll torque Tqt is constant, the additional angular velocity Awd' can change depending on the velocity V and the wheel angle Aw. It should be noted that in this embodiment, the processor 110p sets a fourth upper limit Lm4 to the absolute value of Awd'. In FIG. 14(C), the horizontal axis represents the velocity V, and the vertical axis represents the absolute value of the additional angular velocity Awd'. The larger the velocity V is, the smaller the absolute value of Awd' is. In this embodiment, the absolute value of Awd' is inversely proportional to V, as also indicated in Equation A8 described above. In order to prevent the additional angular velocity Awd' from diverging when the velocity V is smaller, the absolute value of Awd' is limited to the fifth upper limit Lm5. In FIG. 14(D), the horizontal axis represents the absolute value of the wheel angle Aw, and the vertical axis represents the absolute value of the additional angular velocity Awd'. The larger the absolute value of the wheel angle Aw is, the smaller the absolute value of Awd' is. In this embodiment, as the absolute value of Aw increases, the absolute value of Awd' decreases according to $\cos^2(Aw)$, as also indicated in Equation A8 described above.

In S240a (FIG. 13), the processor 110p determines a control parameter. In this embodiment, the processor 110p determines a P gain Gp2 for proportional control (sometimes referred to as second gain Gp2). It should be noted that the processor 110p performs S220a-S235a and S240a in parallel. In S270a, the processor 110p then determines a control value Cw2 through the proportional control using the additional angular velocity Awd' and the second gain Gp2 (e.g. Cw2=Awd'*Gp2). It should be noted that in this embodiment, the second gain Gp2 is determined to be a predetermined value. Instead, the second gain Gp2 may be a variable value that varies depending on another parameter.

In S280a, the processor 110p provides data indicative of the control value Cw2 to the steering motor control unit 500. The processor 500p of the steering motor control unit 500 controls the electric power to be supplied to the steering motor 65a according to the control value Cw2. Specifically, the processor 500p provides the data indicative of the control value Cw2 to the electric power control module 500c. The electric power control module 500c controls the electric power to be supplied to the steering motor 65a according to the control value CW2. The steering motor 65a outputs the turning torque according to the supplied electric power. Then, the process of FIG. 13 ends. The controller 100a repeatedly performs the process of FIG. 13. As such, the controller 100a continuously controls the steering motor 65a to output the turning torque which suppresses the roll angular acceleration Ar". When the vehicle 10a travels on a rough road, oscillation from side to side (i.e. roll oscillation) of the vehicle body 90a is suppressed.

As discussed above, the control value Cw2 indicates the turning torque mapped to the additional angular velocity Awd' (S270a). A parameter Tqa mapped to the additional angular velocity Awd' according to Equation A8 indicates the first type roll torque Tqa to be generated due to the additional angular velocity Awd'. In S235a, the target roll torque Tqt is used as the parameter Tqa indicative of the first type roll torque to calculate the additional angular velocity Awd' according to Equation A8. Therefore, the target roll torque Tqt indicates the target torque of the first type roll torque. In S230a, a roll torque obtained by inverting the direction of the roll torque Tqr which acts on the vehicle body 90a when the roll angular acceleration is Ar" is used as the target roll torque Tqt. As indicated in Equation B1 described above, the magnitude of the target roll torque Tqt (i.e. the magnitude of the roll torque Tqr) increases with an increase in the magnitude of the roll angular acceleration Ar". The direction of the target roll torque Tqt (i.e. a direction opposite to the roll torque Tqr) is opposite to the direction of the roll angular acceleration Ar". In this manner, the roll angular acceleration Ar" indicates the reference roll torque which is a reference of the first type roll torque to be generated due to the additional angular velocity Awd'. The magnitude of the roll angular acceleration Ar" indicates a reference magnitude which is the magnitude of the reference roll torque. The direction opposite to the direction of the roll angular acceleration Ar" indicates a reference direction which is the direction of the reference roll torque. The roll angular acceleration Ar" is an example of reference information which indicates the reference direction as a reference of direction and the reference magnitude as a reference of magnitude for the first type roll torque to act on the vehicle body 90a (hereinafter, the roll angular acceleration Ar" may be referred to as reference information Ar"). The controller 100a controls the steering motor 65a according to the control value Cw2 to be determined using the reference information Ar". As such, the steering motor 65a generates the turning torque so that the direction of the first type roll torque is the same as the reference direction, and the magnitude of the first type roll torque increases with an increase in the reference magnitude. If the steering motor 65a is controlled according to the control value Cw2, the roll angular acceleration Ar" is suppressed from increasing, and thus the roll angle Ar is suppressed from changing.

FIG. 14(E)-FIG. 14(G) are graphs showing examples of the turning torque Tqw to be controlled in the process of FIG. 13. In FIG. 14(E), the horizontal axis represents the absolute value of the control value Cw2, and the vertical axis represents the absolute value of the turning torque Tqw. The absolute value of the turning torque Tqw increases with an increase in the absolute value of the control value Cw2. It should be noted that in this embodiment, the processor 110p modifies the absolute value of the control value Cw2 to a predetermined upper limit CwM2 in S280a of FIG. 13 if the absolute value of the control value Cw2 is equal to or larger than the upper limit CwM2. Accordingly, the absolute value of the turning torque Tqw is limited to an upper limit Lm6 mapped to the upper limit CwM2. As a result, the wheel angle Aw is suppressed from changing rapidly.

In FIG. 14(F), the horizontal axis represents the roll angular acceleration Ar", and the vertical axis represents the turning torque Tqw. At the origin O, Ar"=0, and Tqw=0. In this figure, assume that the velocity V, input angle AI, wheel angle Aw, and yaw angular velocity Ay' each are constant. Such a condition can be reproduced by placing the vehicle 10a on the turntable, as in the condition of FIG. 10(B). The absolute value of the target roll torque Tqt to be determined in S280a (FIG. 13) increases with an increase in the absolute value of the roll angular acceleration Ar". Accordingly, the larger the absolute value of the roll angular acceleration Ar" is, the larger the absolute value of the turning torque Tqw is also (however, the absolute value of the turning torque Tqw is limited to the upper limit Lm6).

In addition, the roll angular acceleration Ar" being a positive value indicates that the reference roll direction is the left direction opposite to the right direction which is the direction of the roll angular acceleration Ar". As can be understood from FIG. 6(B), FIG. 6(C), when turning the direction of the front wheels FRa, FLa to the right direction DR, the direction of the first type roll torque Tqa is the left direction DL. Accordingly, in order to generate the first type roll torque Tqa of the left direction DL, a positive turning roll torque Tqw is generated that turns the direction of the front wheels FRa, FLa to the right direction DR. In contrast, when the roll angular acceleration Ar" is a negative value, a negative turning torque Tqw is generated.

In FIG. 14(G), the horizontal axis represents the absolute value of the wheel angle Aw, and the vertical axis represents the absolute value of the turning torque Tqw. This graph illustrates characteristics under the condition (referred to as first condition) that each of the velocity V and the roll angular acceleration Ar" (i.e. the reference direction and reference magnitude) is maintained constant (the absolute value of the roll angular acceleration Ar" is larger than zero). In order to identify the relationship between the wheel angle Aw and the turning torque Tqw, assume that the other parameters (e.g. AI, Ay') are constant. The wheel angle Aw is variable. In order to realize such a condition, the vehicle 10a is placed on the turntable described with regard to FIG. 10(C).

As shown, even if the roll angular acceleration Ar" is constant, the absolute value of the turning torque Tqw decreases as the absolute value of the wheel angle Aw increases. This reason is that the angular velocity Aw' of the wheel angle Aw (i.e. the turning torque Tqw) decreases according to $\cos^2(Aw)$ as indicated in Equation A8 described above. In this manner, because the turning torque Tqw is controlled according to Equation A8, the controller 100a can make the first type roll torque due to the angular velocity Aw' close to the reference torque.

As discussed above, the controller 100a performs the process of FIG. 13 to control the steering motor 65a so that the roll angular acceleration Ar" decreases. As a result, oscillation from side to side (i.e. roll oscillation) of the vehicle body 90a is suppressed. In addition, as described with reference to FIG. 6(B), FIG. 6(C), the first type roll torque Tqa obtained using the angular velocity Aw' of the wheel angle Aw is generated using the inertial force F12 in the direction opposite to that of the yaw angular acceleration Ay". Accordingly, when the first type roll torque Tqa is applied to the vehicle body 90a, the lateral acceleration which the driver feels is suppressed.

C. Third Embodiment

Figure 15:
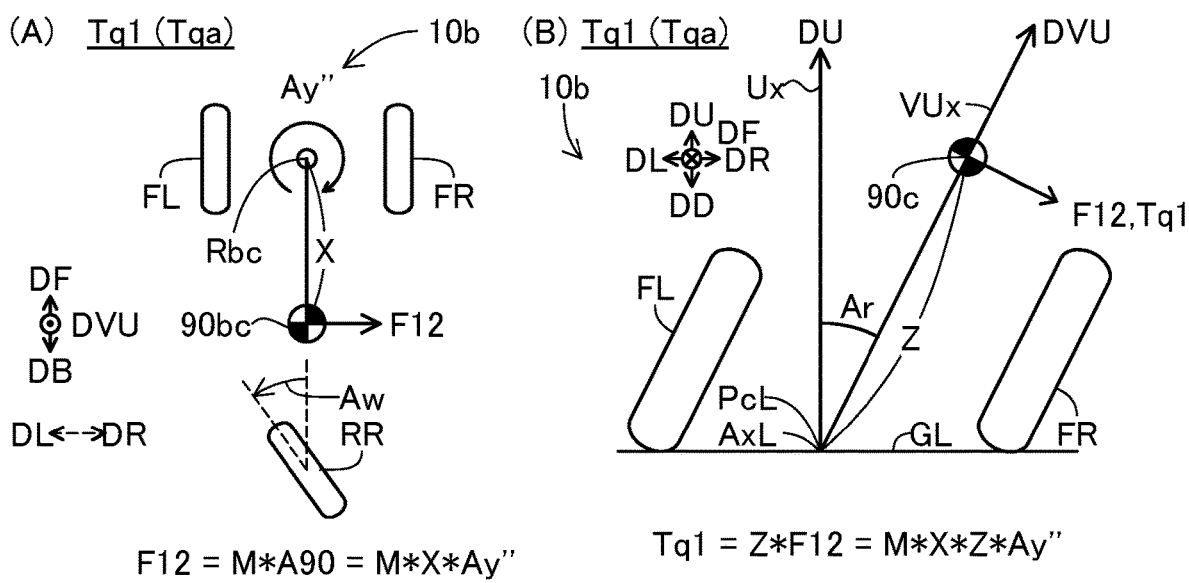
FIGS. 15(A), (B) are explanatory diagrams of roll torques Tq3, Tq4 when a rear wheel is a turn wheel.

In the above-mentioned embodiments, the front wheels 12F, FRa, FLa are turn wheels. Instead, the rear wheels may be turn wheels. FIG. 15(A), FIG. 15(B) are explanatory diagrams of the roll torques Tq1, Tqa when the rear wheel is a turn wheel. FIG. 15(A), FIG. 15(B) are explanatory diagrams similar to FIG. 6(B), FIG. 6(C). The vehicle 10a in this embodiment has two front wheels (right front wheel FR and left front wheel FL) and one rear wheel RR. When the vehicle 10b turns to the right direction DR, the rear wheel RR turns to the left direction DL.

In FIG. 15(A), a rotation center Rbc is shown. In this embodiment, the front wheels FR, FL are not turn wheels, and the rear wheel RR is a turn wheel. Accordingly, the rotation center Rbc is located in the proximity of the center between the front wheels FR, FL. The gravity center 90bc of the vehicle body is located away from the rotation center Rbc toward the back direction DB side. A distance X in this figure represents a distance in the front direction DF between the gravity center 90bc and the rotation center Rbc.

The gravity center 90bc of the vehicle body is located away from the rotation center Rbc by the distance X toward the back direction DB side. Accordingly, the vehicle body is subject to an inertial force component F12 in the same direction as that of the yaw angular acceleration Ay". The direction of the inertial force component F12 is perpendicular to the vehicle body upward direction DVU. Also, in this embodiment, the direction from the rotation center Rbc to the gravity center 90bc is approximately parallel to the back direction DB in the top view of FIG. 15(A). Accordingly, the direction of the inertial force component F12 is approximately perpendicular to the back direction DB. In the top view of FIG. 15(A), the direction of the yaw angular acceleration Ay", i.e. the direction of change in the yaw angular velocity Ay', is clockwise. In this case, the direction of the inertial force component F12 faces the right direction DR side. The formula for calculating the magnitude of the inertial force component F12 is the same as the formula in FIG. 6(B).

In FIG. 15(B), the inertial force component 12 is shown. It is different from FIG. 6(B), FIG. 6(C) only in that the direction of the inertial force component F12 (i.e. the direction of the roll torque Tq1) is an opposite direction.

In this manner, when the rear wheel RR is a turn wheel, the direction of the roll torque Tq1 is the same as that of the yaw angular acceleration Ay". In addition, as can be understood from FIG. 15(A), FIG. 15(B), when the rear wheel RR turns to the left direction DL, the direction of the first type roll torque Tqa is the right direction DR. Accordingly, in order to generate the first type roll torque Tqa of the right direction DR, the angular velocity Aw' is used that turns the rear wheel RR to the left direction DL. Again in this embodiment, the turning torque of the turn wheel may be controlled according to the process in FIG. 8 or FIG. 13. In so doing, the direction of the roll torque Tq1, Tqa described above is accounted for.

D. Modifications (1) The control process of the turning actuator 65, 65a may be a variety of other processes instead of the control processes in the embodiments of FIG. 8, FIG. 13. For example, the control processes of the above embodiments involve the process of determining an output parameter from an input parameter through the proportional control (e.g. S250 (FIG. 8), S270a (FIG. 13), etc.). Instead of the proportional control, a variety of controls may be employed (e.g. PD (Proportional-Differential) control or PID (Proportional-Integral-Differential) control).

In addition, the magnitude of the turning torque Tqw is determined using Equation A8 described above in each of the above embodiments. Accordingly, the magnitude of the turning torque Tqw increases with an increase in the reference magnitude indicated by the reference information (e.g. roll angle difference dAr or roll angular acceleration Ar"). The magnitude of the turning torque Tqw decreases with an increase in the velocity V. The magnitude of the turning torque Tqw decreases with an increase in the wheel angle Aw. The relationship between the magnitude of the turning torque Tqw and the other parameters (e.g. velocity V, wheel angle Aw, etc.) may differ from those of FIG. 10(A)-FIG. 10(C), FIG. 14(E)-FIG. 14(G). For example, as the magnitude of the wheel angle Aw increases, the magnitude of the turning torque Tqw decreases linearly relative to a change in the magnitude of the wheel angle Aw. In addition, the magnitude of the turning torque Tqw may be smaller relative to the reference magnitude. For example, in the embodiments of FIG. 12, FIG. 13, the magnitude of the turning torque Tqw may be set to a smaller value to prevent the front wheels FR, FL from moving significantly against a force with which the driver holds the steering wheel 42a.

(2) In order to determine the turning torque (e.g. control value Cw, Cw2), a variety of other parameters may be used instead of the parameters shown in FIG. 8, FIG. 13. For example, the following three roll torques are roll torques which acts on the vehicle body depending on the condition of the vehicle.

1) Roll torque due to the gravity which acts on the vehicle body
2) Roll torque due to the centrifugal force which acts on the vehicle body
3) Roll torque due to the yaw angular acceleration of the vehicle (FIG. 6(B), FIG. 6(C))

One or more parameters selected from these three parameters may be used to determine the turning torque. The turning torque may be configured to generate a remaining roll torque obtained by subtracting these roll torques from the reference roll torque.

In order for the vehicle to transition from its straight forward movement to its turning movement, the vehicle body rolls quickly to the turning direction. In this case, the lower portion of the vehicle body can move to a direction opposite to the turning direction because the gravity center of the vehicle body cannot move quickly. For example, the intersection point P2 between the turning axis Ax1 of the turn wheel (in this case, the front wheel 12F) and the ground GL in FIG. 1(A) can move to the direction opposite to the turning direction. As a result, if the vehicle has a positive trail Lt, the turn wheel can turn to the direction opposite to the turning direction. As such, the processor 110p may determine the final control value Cw, Cw2 using a control value indicative of a component of turning torque which causes the turn wheel to turn to the turning direction when the vehicle body rolls quickly. Such a control value may be obtained by multiplying any of the following parameters by a gain.

1) The angular velocity Aw' of the wheel angle Aw
2) The torque of the lean motor 25
3) The angular velocity Ar' of the roll angle Ar
4) The angular acceleration Ar" of the roll angle Ar
5) The angular velocity AI' of the input angle AI
6) The angular acceleration AI" of the input angle AI When the magnitudes of these parameters are larger, the vehicle body rolls quickly, and therefore these parameters are suited for determining the control value. It should be noted that as discussed above, when the velocity V is larger, the turn wheel can turn to the roll direction due the to the gyroscopic moment. Accordingly, the gain is preferably larger when the velocity V is smaller.

As discussed above, the gyroscopic moment causes the turning torque to act on the rotating wheel. The processor 110p may use this turning torque to correct the turning torque Tqw of the steering motor 65, 65a. The turning torque due to the gyroscopic moment can be calculated using the velocity V and the roll angle Ar, for example.

In addition, when the wheel is leaning to right or left, a so-called camber thrust acts on the wheel. Accordingly, the camber thrust causes the turning torque to act on the wheel.

The processor 110p may use this turning torque to correct the turning torque Tqw of the steering motor 65, 65a. The turning torque due to the camber thrust can be calculated using the velocity V and the roll angle Ar, for example.

(3) The method of determining the turning torque from the additional angular velocity Awd' may be a variety of other methods instead of the methods of FIG. 8, FIG. 13. For example, the processor 110p may determine the target wheel angle by integrating the additional angular velocity Awd'. The processor 110p then may control the steering motor 65 so that the current wheel angle Aw approaches the target wheel angle.

(4) The method of setting the upper limit to the turning torque may be a variety of methods. For example, in the example of FIG. 9(F), when the velocity V is equal to or smaller than the threshold VL, the absolute value of the additional angular velocity Awd' is limited to the first upper limit Lm1. Instead, when the velocity V is equal to or smaller than the threshold VL, the processor 110p may control the steering motor 65, 65a assuming that the velocity V is equal to the threshold VL.

(5) The target roll angle Art (FIG. 8: S220) may be determined using another piece of information (e.g. the velocity V) in addition to the input angle AI.

(6) A measured value may be used as the mass M of the vehicle body instead of the predetermined value. The vehicle body 10 (FIG. 1(A)) may include a sensor for measuring the mass M of the vehicle body 90. Such a sensor may be a sensor which detects a stroke position of the right suspension 70R (FIG. 2), for example. The larger the mass M of the vehicle body 90 is, the shorter the entire length of the right suspension 70R is. Accordingly, the stroke position is a parameter which is correlated with the mass M. The processor 110p may determine the entire length from the stroke position to estimate the mass M from the determined entire length.

(7) A measured position may be used as the position of gravity center of the vehicle body instead of the predetermined position. For example, the vehicle 10 (FIG. 1(A)) may include a front sensor for measuring a stroke position of the front fork 17 and a rear sensor for detecting a stroke position of the right suspension 70R (FIG. 2). If the gravity center is located on the front direction DF side, a larger load is applied on the front fork 17, and the entire length of the front fork 17 decreases accordingly. If the gravity center is located on the back direction DB side, a larger load is applied on the right suspension 70R, and the entire length of the right suspension 70R decreases accordingly. The processor 110p can use the entire lengths of the front fork 17 and right suspension 70R to estimate the position of gravity center in the front direction DF. The processor 110p can use the estimated position of gravity center to calculate the distance X (FIG. 6(E), etc.) between the rotation center and the gravity center. A predetermined position may be used as the rotation center.

Alternatively, the processor 110p may estimate the distance Z of the gravity center by oscillating the vehicle body to right and left. For example, the processor 110p causes the lean motor 25 to output a torque which rolls the vehicle body. If the distance Z is shorter, the roll angle Ar changes quickly. If the distance Z is longer, the roll angle Ar changes slowly. In this manner, it can be presumed that the larger the angular velocity Ar' or angular acceleration Ar" of the roll angle Ar resulting from the constant torque is, the shorter the distance Z is.

(8) The data indicative of a parameter (e.g. physical quantity such as the velocity V) used for the control may be a variety of data correlated with the parameter. For example, the vehicle velocity sensor 122 outputs data indicative of the rotational rate of the front wheel 12F as data indicative of the velocity V.

(9) The direction sensor 126 (FIG. 1(A)) may output data indicative of yaw angular velocity about an axis parallel to the vertically upward direction DU (FIG. 6(D)). In this case, the processor 110p can use the roll angle Ar to correct a deviation between the magnitude of the yaw angular velocity relative to the vertically upward direction DU and the magnitude of the yaw angular velocity Ay' relative to the vehicle body upward direction DVU. Alternatively, the direction sensor 126 may output data indicative of yaw angular acceleration instead of the yaw angular velocity. In this case, the processor 110p may determine the yaw angular velocity by integrating the yaw angular acceleration.

(10) The method of defining a correspondence relationship between one or more control parameters (such as the velocity V, input angle AI) and the control value Cw, Cw2 (i.e. the turning torque) may be any other method instead of the method involving the above-mentioned calculation. For example, map data may be provided in advance that defines the correspondence relationship between the one or more control parameters and the control value Cw, Cw2. The processor 110p may reference this map data to identify the control value Cw, Cw2.

(11) The reference information may be a variety of information which indicates a reference direction as a reference of direction and a reference magnitude as a reference of magnitude for the first type roll torque to act on the vehicle body, instead of the roll angle difference dAr and the roll angular acceleration Ar".

In addition, the method of determining the reference information may be a variety of methods. For example, the vehicle may include an automatic driving control device (e.g. computer) which automatically drives the vehicle. The automatic driving control device may determine a target turning radius according to a current location of the vehicle on a predetermined travel route. The processor 110p uses the target turning radius and the current velocity V to calculate the target roll angle Ar according to Equation 6 described above. The processor 110p then may use the target roll angle Ar and the current roll angle Ar to determine the roll angle difference dAr (i.e. the reference information dAr).

(12) The force generator configured to generate a force which changes the yaw angular acceleration may be any other device instead of the steering motor 65, 65a. For example, the force generator may be a fan device which produces airflow flowing to right or left relative to the vehicle body. The drive system 51S (FIG. 2) (i.e. the drive motors 51R, 51L) can also change the yaw angular acceleration by controlling a ratio of torque between the right rear wheel 12R and the left rear wheel 12L (such a control of torque ratio is also referred to as torque vectoring). Also, if the vehicle 10 includes a brake device for the right rear wheel 12R and a brake device for the left rear wheel 12L, these brake devices can change the yaw angular acceleration by controlling a ratio of braking force between the right rear wheel 12R and the left rear wheel 12L. The force generator may include one or more types of devices (such as the steering motor 65, the drive system 51S, the brake device). In addition, the force controller may include one or more types of controllers for controlling the one or more types of force generators, respectively.

(13) The configuration of the lean device configured to lean the vehicle body in the width direction of the vehicle may be a variety of other configurations instead of the configuration of the link mechanism 30 (FIG. 2). For example, the link mechanism 30 may be substituted with a pedestal. The motor 51L, 51R are secured to the pedestal. And, the first support portion 82 is coupled to the pedestal via a bearing rotatably in the width direction. The lean motor 25 rotates the first support portion 82 in the width direction relative to the pedestal. This enables the vehicle body 90 to lean to each of the right direction DR side and the left direction DL side. Alternatively, the lean device may include a left sliding device and a right sliding device (e.g. hydraulic cylinder). The left sliding device may connect the left rear wheel 12L and the vehicle body, and the right sliding device may connect the right rear wheel 12R and the vehicle body. Each sliding device can change the position of the wheel relative to the vehicle body in the vehicle body upward direction DVU.

(14) A variety of configurations may be employed as the total number and arrangement of the plurality of wheels. For example, the plurality of wheels may include a pair of wheels spaced apart from each other in the width direction of the vehicle. A front wheel (e.g. the front wheel 12F of FIG. 1(A)) may be a drive wheel. The total number of turn wheel(s) may be any number equal to or larger than one. At least one of front wheel(s) or rear wheel(s) may include turn wheel(s). Both the front wheel(s) and the rear wheel(s) may be turn wheels. The turn wheels may include a pair of wheels spaced apart from each other in the width direction of the vehicle.

(15) The configuration of turn wheel support device for supporting the turn wheel may be a variety of other configuration instead of the configuration of the front wheel support device 41 described with reference to FIG. 1(A) etc. For example, the supporting member which rotatably supports the turn wheel may be a cantilevered member instead of the fork 17. In addition, the turning device that supports the supporting member turnably in the width direction relative to the vehicle body may be a variety of other devices instead of the bearing 68. For example, the turning device may be a link mechanism coupling the supporting member to the vehicle body. In general, the turn wheel support device may be a variety of devices which support the turn wheel so that the direction of the turn wheel can turn in the width direction of the vehicle.

The turn wheel support device may include K (K is an integer equal to or larger than 1) supporting members. Each supporting member may rotatably support one or more turn wheels. The turn wheel support device may include K turning devices secured to the vehicle body. The K turning devices may support the K supporting members turnably in the width direction, respectively.

(16) The configuration of turning actuator may be a variety of configurations configured to apply a turning torque, which is a torque for controlling the turn of the turn wheel in the width direction, on the turn wheel, instead of the configuration of the steering motor 65 (FIG. 1). For example, the turning actuator may include a pump, and may use fluid pressure (e.g. oil pressure) from the pump to generate the turning torque. In any case, the turning actuator may be configured to apply the turning torque on each of the K supporting members. For example, the turning actuator may be coupled to each of the K supporting members.

(17) The configuration of the controller 100 may be a variety of configurations which include a force controller configured to control a force generator (e.g. the steering motor 65, 65a). For example, the controller 100 may be configured using a single computer. At least part of the controller 100 may be configured with dedicated hardware such as ASIC (Application Specific Integrated Circuit). For example, the steering motor control unit 500 in FIG. 7 may be configured with an ASIC. The controller 100 may be an electric circuit with a computer, or may be an electric circuit without any computer instead. In addition, input values and output values mapped by map data (e.g. the map data MAr, etc.) may be mapped by any other element. For example, an element such as mathematical function, analog electric circuit, etc. may map the input values to the output values.

(18) The configuration of vehicle may be a variety of other configurations instead of the configurations in the embodiments. For example, the drive device for driving the drive wheels may include at least one of electric motor or internal combustion engine. The maximum riding capacity of the vehicle may be two or more persons instead of one person. The vehicle may be an apparatus which travels without at least one of person or load. The vehicle may be an apparatus which travels via remote control. The correspondence relationship used to control the vehicle (e.g. the correspondence relationship represented by the map data) may be determined experimentally to allow the vehicle to travel properly.

In each embodiment described above, some of the components which are achieved by hardware may be substituted with software while some or all of the components which are achieved by software may be substituted with hardware. For example, the function of the controller 100 in FIG. 7 may be achieved by a dedicated hardware circuitry.

In addition, if some or all of the functions of the present disclosure are achieved by a computer program, the program can be provided in the form of a computer-readable storage medium (e.g. non-transitory storage medium) having the program stored therein. The program can be used while being stored in a storage medium (computer-readable storage medium) which is the same as or different from the provided storage medium. The "computer-readable storage medium" is not limited to a portable storage medium such as memory card or CD-ROM, but may also include an internal storage within the computer such as various types of ROM, and an external storage connected to the computer such as hard disk drive.

The present disclosure has been described above with reference to the embodiments and the modifications although the above-described embodiments are intended to facilitate the understanding of the disclosure, but not to limit the disclosure. The present disclosure may be modified or improved without departing from the spirit of the disclosure, and includes its equivalents.

INDUSTRIAL APPLICABILITY

The present disclosure can be preferably used for a vehicle.

DESCRIPTION OF THE REFERENCES 10, 10a, 10b vehicle
11 seat
12F, FRa, FLa, FR, FL front wheel
12L left rear wheel
12R right rear wheel
RRa, RLa, RR rear wheel
17 front fork
20 main body
20a front wall portion
20b bottom portion
20c rear wall portion 20*d* support portion
21 center longitudinal link member
25 lean motor
30 lean device (link mechanism)
31D lower lateral link member
31U upper lateral link member
33L left longitudinal link member
33R right longitudinal link member
38 bearing
39 bearing
41 front wheel support device
41*a* steering wheel
42 steering device
42*a* steering wheel
45 accelerator pedal
46 brake pedal
51L left drive motor
51R right drive motor
51S drive system
51*a* drive motor
65 turning actuator
65, 65*a* steering motor
68 bearing
70 suspension system
70L left suspension
70R right suspension
71R, 71L coil spring
72R, 72L shock absorber
75 connector rod
80 rear wheel support
82 first support portion
83 second support portion
90, 90*a* vehicle body
90*c*, 90*ac*, 90*bc* gravity center
100, 100*a* controller
110 main control unit
110*p*, 300*p*, 400*p*, 500*p* processor
110*v*, 300*v*, 400*v*, 500*v* volatile memory
110*n*, 300*n*, 400*n*, 500*n* non-volatile memory
110*g*, 300*g*, 400*g*, 500*g* program
300*c*, 400*c*, 500*c* electric power control module
120 battery
122 vehicle velocity sensor
123 input angle sensor
124 wheel angle sensor
126 direction sensor
126*a* acceleration sensor
126*c* control unit
126*g* gyroscope sensor
145 accelerator pedal sensor
146 brake pedal sensor
300 drive device control unit
400 lean motor control unit
500 steering motor control unit
900 drive controller
910 turn controller
Axw1 rotational axis
Axw2 rotational axis
Axw3 rotational axis

The invention claimed is:

1. A vehicle comprising:
a vehicle body;
N (N is an integer equal to or larger than 2) wheels including one or more front wheels and one or more rear wheels, the N wheels including one or more turn wheels turnable in a width direction of the vehicle;
a force generator configured to generate a force which changes a yaw angular acceleration; and
a force controller configured to control the force generator, wherein:
a gravity center of the vehicle body is located away from a rotation center of the vehicle toward front side or rear side when the vehicle turns, and
the force controller controls the force generator to control a roll torque in the width direction acting on the vehicle body,
the force generator is configured to apply a turning torque on the one or more turn wheels, the turning torque being a torque for controlling a turn of the one or more turn wheels in the width direction,
a roll torque resulting from a component of yaw angular acceleration resulting from a turn of the one or more turn wheels and a positional difference between the gravity center and the rotation center is referred to as first type roll torque, and
the force controller is configured to:
determine reference information indicating a reference direction as a reference of direction and a reference magnitude as a reference of magnitude for the first type roll torque to act on the vehicle body;
control the force generator so that the direction of the first type roll torque is the same as the reference direction and a magnitude of an additional angular velocity increases with an increase in the reference magnitude when a vehicle velocity is constant and an angle of a turn of the one or more turn wheels is constant, the additional angular velocity being an additional angular velocity of the turn of the one or more turn wheels by applying of the turning torque; and
control the force generator so that the direction of the first type roll torque is the same as the reference direction and the magnitude of the additional angular velocity decreases with an increase in the vehicle velocity when the reference magnitude is constant and the angle of the turn of the one or more turn wheels is constant.

2. The vehicle of claim 1, wherein
a condition that each of the vehicle velocity, the reference direction, the reference magnitude, and a yaw angular velocity of the vehicle is maintained constant is referred to as first condition, and
the force controller causes the force generator to generate the turning torque having a magnitude which decreases with an increase in a difference between an angle of turn of the one or more turn wheels and an angle of turn indicative of straight forward traveling under the first condition.

3. The vehicle of claim 1, wherein
the reference information indicates a reference roll direction from a roll angle of the vehicle body to a reference roll angle, and an angle difference magnitude, the angle difference magnitude being a magnitude of difference between the roll angle of the vehicle body and the reference roll angle,
the reference roll direction indicates the reference direction, and
the angle difference magnitude indicates the reference magnitude.

4. The vehicle of claim 1, wherein
the reference information indicates a roll angular acceleration of the vehicle body, a magnitude of the roll angular acceleration indicates the reference magnitude, and a direction opposite to a direction of the roll angular acceleration indicates the reference direction.

5. The vehicle of claim 1, wherein the force controller controls the force generator using the reference information, the vehicle velocity, and an angle of turn of the one or more turn wheels, and a magnitude of the turning torque increases with an increase in the reference magnitude, decreases with an increase in the vehicle velocity, and decreases with an increase in a difference between the angle of the turn of the one or more turn wheels and an angle of turn indicative of straight forward traveling.

6. The vehicle of claim 1, wherein the one or more front wheels include the one or more turn wheels, the gravity center of the vehicle body is located away from and on front side of the rotation center, and the direction of the turning torque is opposite to the reference direction.

7. The vehicle of claim 1, wherein the force controller is configured to control the force generator so that the direction of the first type roll torque is the same as the reference direction and the magnitude of the additional angular velocity decreases with an increase in a difference between the angle of the turn of the one or more turn wheels and an angle of turn indicative of straight forward traveling when the reference magnitude is constant and the vehicle velocity is constant.

* * * * *